(12) United States Patent
Suzuki

(10) Patent No.: US 12,159,169 B2
(45) Date of Patent: Dec. 3, 2024

(54) INFORMATION PROCESSING APPARATUS AND JOB SCHEDULING METHOD

(71) Applicant: FUJITSU LIMITED, Kawasaki (JP)

(72) Inventor: Shigeto Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 457 days.

(21) Appl. No.: 17/723,517

(22) Filed: Apr. 19, 2022

(65) Prior Publication Data

US 2023/0062402 A1 Mar. 2, 2023

(30) Foreign Application Priority Data

Aug. 26, 2021 (JP) ................................. 2021-138112

(51) Int. Cl.
*G06F 9/50* (2006.01)
*G06F 9/48* (2006.01)

(52) U.S. Cl.
CPC ............ *G06F 9/505* (2013.01); *G06F 9/4881* (2013.01)

(58) Field of Classification Search
CPC ....... G06F 9/505; G06F 9/4881; G06F 9/5083
See application file for complete search history.

(56) References Cited

U.S. PATENT DOCUMENTS

| | | | | |
|---|---|---|---|---|
| 6,785,675 B1* | 8/2004 | Graves | .................. | G06F 16/284 |
| | | | | 707/999.005 |
| 8,695,009 B2* | 4/2014 | Vojnovic | ............... | G06F 9/5038 |
| | | | | 718/104 |
| 9,471,391 B1* | 10/2016 | Abramson | ............ | G06F 16/285 |
| 10,387,179 B1* | 8/2019 | Hildebrant | ............ | G06F 9/4843 |
| 10,754,706 B1* | 8/2020 | Mo | ......... | G06F 9/5038 |
| 11,263,052 B2* | 3/2022 | Saxena | ................. | G06F 9/5077 |
| 2006/0106931 A1 | 5/2006 | Richoux | | |
| 2007/0143765 A1* | 6/2007 | Aridor | ................... | G06F 9/5011 |
| | | | | 718/104 |
| 2008/0098395 A1 | 4/2008 | Backer | | |
| 2012/0159507 A1* | 6/2012 | Kwon | ................... | G06F 9/5088 |
| | | | | 718/104 |
| 2013/0326523 A1* | 12/2013 | Raghu | ................... | G06F 9/5066 |
| | | | | 718/102 |

(Continued)

FOREIGN PATENT DOCUMENTS

JP 2012-173753 A 9/2012
JP 2020-201741 A 12/2020

*Primary Examiner* — Jorge A Chu Joy-Davila
(74) *Attorney, Agent, or Firm* — Fujitsu Intellectual Property Center

(57) ABSTRACT

An information processing apparatus calculates a first load value indicating the load of a plurality of first jobs whose used node counts are less than or equal to a threshold among jobs waiting for execution, and a second load value indicating the load of a plurality of second jobs whose used node counts exceed the threshold among the waiting jobs. If load conditions including one where the first load value exceeds the second load value are satisfied, the information processing apparatus combines two or more first jobs among the plurality of first jobs to create a combined job whose used node count exceeds the threshold. The information processing apparatus causes a first node group to execute the remaining first jobs among the plurality of first jobs and causes a second node group to execute the combined job and the plurality of second job.

6 Claims, 16 Drawing Sheets

(56) References Cited

U.S. PATENT DOCUMENTS

| | | | |
|---|---|---|---|
| 2015/0220370 A1* | 8/2015 | Ujibashi | G06F 9/5088 |
| | | | 718/104 |
| 2017/0046201 A1* | 2/2017 | Modani | G06F 9/4881 |
| 2017/0109199 A1* | 4/2017 | Chen | G06F 9/5027 |
| 2017/0180507 A1* | 6/2017 | Thierry | G06F 9/505 |
| 2020/0394045 A1 | 12/2020 | Iwata | |
| 2021/0209460 A1* | 7/2021 | Hoefler | G06N 3/063 |
| 2021/0342184 A1* | 11/2021 | Liu | G06F 9/5083 |
| 2022/0129307 A1* | 4/2022 | Strenski | G06F 9/4881 |

\* cited by examiner

DATABASE

CLUSTER TABLE  131

| CLUSTER ID | RANGE OF NODE IDs | RANGE OF USED NODE COUNTS |
|---|---|---|
| 1 | [1, 21429] | [1, 46] |
| 2 | [21430, 30000] | [47, 2154] |
| 3 | [30001, 50000] | [2155, 10000] |

NODE TABLE  132

| NODE ID | STATUS | JOB ID |
|---|---|---|
| 1 | BUSY | 100200 |
| 2 | BUSY | 100200 |
| 3 | IDLE | – |
| ... | ... | ... |

HISTORY TABLE  133

| TIMESTAMP | USED NODE COUNT | WAITING TIME | EXECUTION TIME |
|---|---|---|---|
| 2020-04-01 10:00:21 | 16 | 800 | 2400 |
| 2020-04-01 10:08:35 | 64 | 1400 | 3000 |
| ... | ... | ... | ... |

FIG. 11

INFORMATION PROCESSING APPARATUS AND JOB SCHEDULING METHOD

CROSS-REFERENCE TO RELATED APPLICATION

This application is based upon and claims the benefit of priority of the prior Japanese Patent Application No. 2021-138112, filed on Aug. 26, 2021, the entire contents of which are incorporated herein by reference.

FIELD

The embodiments discussed herein relate to an information processing apparatus and a job scheduling method.

BACKGROUND

A large-scale information processing system such as a high performance computing (HPC) system includes a plurality of nodes that each have a processor to execute programs. The information processing system with the plurality of nodes may execute a plurality of jobs requested by different users. A job is a single unit of information processing. The load of information processing depends on jobs. One job may use two or more nodes in parallel. For example, a user specifies the number of nodes used for a job before the job starts.

An information processing system shared by a plurality of users has a scheduler that performs scheduling to assign jobs to nodes. In the case where the number of currently idle nodes is not enough to execute a job, the job waits until as many nodes as needed for the job become idle. There are a variety of scheduling algorithms that are executable by the scheduler. Different scheduling algorithms may set different start times for the same job. That is to say, the choice of what scheduling algorithm to use influences the waiting time of each job.

For examples, there has been proposed an HPC system that classifies newly added jobs into three types and executes a different method according to the type of a job to select a node group and assign the job to the selected node group. There also has been proposed a server that classifies jobs into three types, short, medium, and long jobs, according to their scheduled execution times and gives higher priority to jobs with shorter scheduled execution times in scheduling.

In addition, there has been proposed a job scheduler that performs scheduling using a two-dimensional map with a vertical axis representing nodes and a horizontal axis representing time. In the case of accepting a small-scale job that uses a small number of nodes after accepting a large-scale job that uses a large number of nodes, this proposed job scheduler permits execution of the small-scale job prior to the large-scale job unless the execution of the small-scale job causes a delay in the start of execution of the large-scale job.

In addition, there has been proposed a job management apparatus that provisionally creates a job schedule by assigning jobs to nodes in order of priority from the highest, and changes the job schedule by backfill scheduling in the case where idle nodes exist in a certain time zone. The backfill scheduling is a process that moves up the execution start time of a small-scale job that has been scheduled to execute at a later time zone than the time zone in which the idle nodes exist, unless this schedule change influences the execution of other jobs with high priority.

See, for example, U.S. Patent Application Publication No. 2006/0106931, U.S. Patent Application Publication No. 2008/0098395, Japanese Laid-open Patent Publication No. 2012-173753, and Japanese Laid-open Patent Publication No. 2020-201741.

In the case where scheduling is performed for large-scale jobs, which use large numbers of nodes, and small-scale jobs, which use small numbers of nodes, in a mixed manner, early start of a small-scale job may cause a lack of idle nodes for a large-scale job and thus the large-scale job may have a relatively long waiting time. A big difference in waiting time between the large-scale jobs and the small-scale jobs is not desirable for users.

To deal with this, one of methods considered is to divide a set of nodes provided in an information processing system into a node group used for large-scale jobs and a node group used for small-scale jobs and perform scheduling for large-scale jobs and for small-scale jobs separately so that the jobs of both scales do not influence each other.

In this method, the number of nodes belonging to the node group for large-scale jobs and the number of nodes belonging to the node group for small-scale jobs are fixed even in a short period of time. If a large number of jobs of either small or large scale are concentrated in a short period of time, the jobs of the scale in question would temporarily have a longer waiting time than the jobs of the other scale.

SUMMARY

According to one aspect, there is provided an information processing apparatus including: a memory that holds information on waiting jobs waiting for execution, the waiting jobs each having a used node count specified; and a processor that performs a process including calculating a first load value and a second load value, the first load value indicating a first load of a plurality of first jobs whose used node counts are less than or equal to a threshold among the waiting jobs, the second load value indicating a second load of a plurality of second jobs whose used node counts exceed the threshold among the waiting jobs, combining two or more first jobs among the plurality of first jobs to create a combined job whose used node count exceeds the load condition being threshold, in response to a satisfied, the load condition including a condition that the first load value exceeds the second load value, causing a first node group to execute remaining first jobs other than the two or more first jobs among the plurality of first jobs, and causing a second node group to execute the combined job and the plurality of second jobs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an example of a cluster table, a node table, and a history table;

DESCRIPTION OF EMBODIMENTS

Hereinafter, some embodiments will be described with reference to the accompanying drawings.

First Embodiment

A first embodiment will be described.

Figure 1:
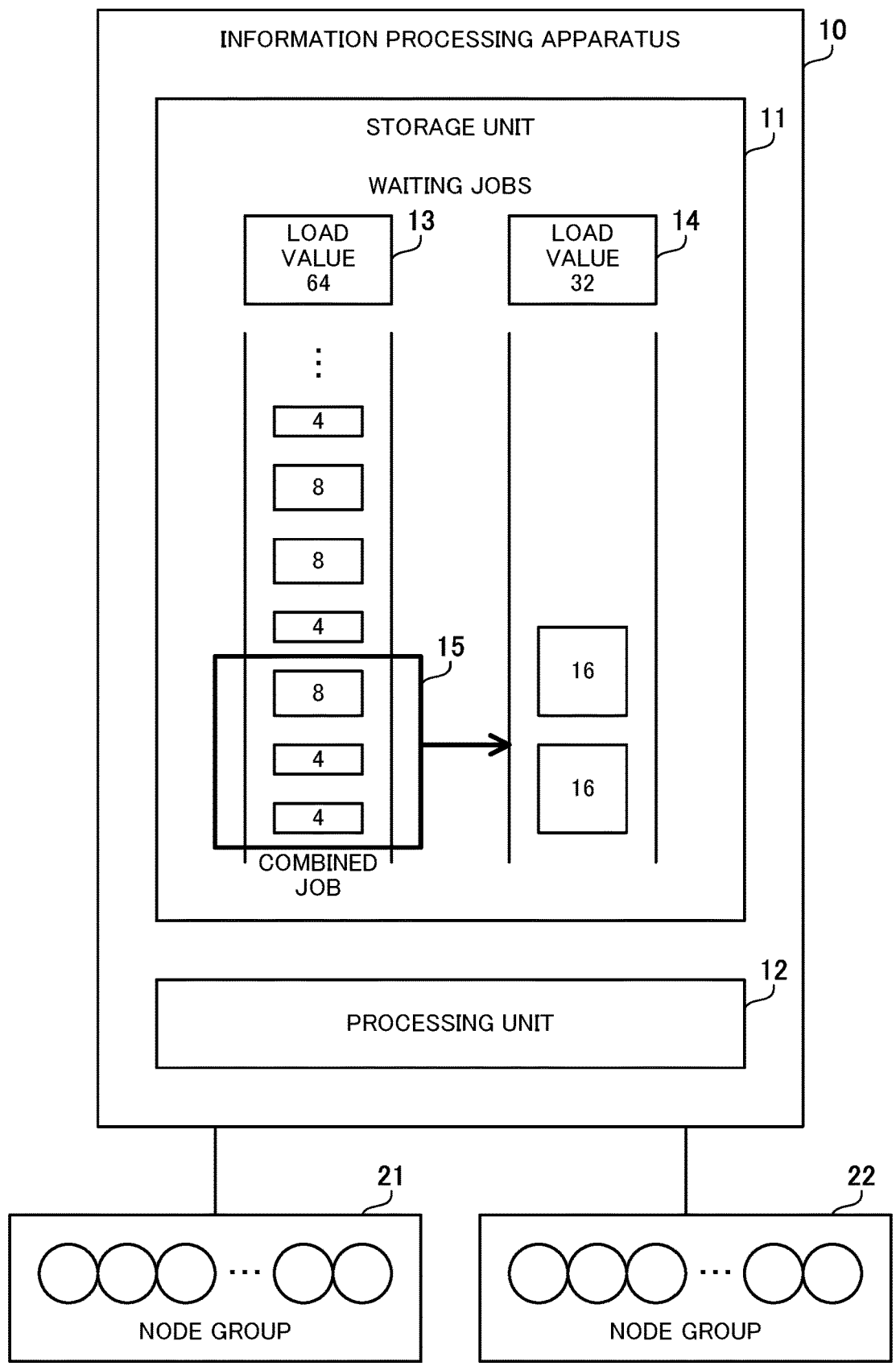
FIG. 1 is a view for describing an information processing apparatus according to a first embodiment.

FIG. 1 is a view for describing an information processing apparatus according to the first embodiment.

The information processing apparatus 10 performs job scheduling. The information processing apparatus 10 communicates with node groups 21 and 22 that are used to execute jobs. The node groups 21 and 22 may be in an HPC system. The information processing apparatus 10 may be a client device or a server device. The information processing apparatus 10 may be called a computer or a scheduler.

The information processing apparatus 10 includes a storage unit 11 and a processing unit 12. The storage unit 11 may be a volatile semiconductor memory, such as a random access memory (RAM), or a non-volatile storage device, such as a hard disk drive (HDD) or a flash memory. For example, the processing unit 12 is a processor such as a central processing unit (CPU), a graphics processing unit (GPU), or a digital signal processor (DSP). The processing unit 12 may include an application specific integrated circuit (ASIC), a field programmable gate array (FPGA), or another application-specific electronic circuit. The processor may execute programs stored in a memory such as a RAM (e.g. storage unit 11). A set of processors may be called "a multiprocessor" or simply "a processor."

The information processing apparatus 10 may be connected to the node groups 21 and 22 over a network. The network may include a local area network (LAN) and a wide-area network such as the Internet. The node groups 21 and 22 each include a plurality of nodes. For example, a node is a computer that executes specified programs. The node may include a processor and a memory. The node groups 21 and 22 may be formed by dividing an original set of nodes.

A single job uses one or more nodes. The nodes assigned a job execute programs specified by the job. With respect to a job that uses two or more nodes, the two or more nodes execute programs in parallel. These two or more nodes may mutually communicate with each other while executing the job. For each job, the number of nodes used for executing the job (hereinafter, referred to as the "used node count" of the job) is specified in advance. For example, the used node count is specified by a user who requests the execution of the job.

The node group 21 handles jobs whose used node counts are less than or equal to a threshold among jobs with different used node counts. Jobs whose used node counts are less than or equal to the threshold may be called small-scale jobs. In principle, the small-scale jobs are assigned to nodes belonging to the node group 21. On the other hand, the node group 22 handles jobs whose used node counts exceed the threshold. The jobs whose used node counts exceed the threshold may be called large-scale jobs. In principle, the large-scale jobs are assigned to nodes belonging to the node group 22. In this connection, three or more node groups that handle different used node counts may be formed.

The storage unit 11 holds information on waiting jobs whose used node counts have been specified. A waiting job waits for execution until as many nodes as the specified used node count become idle. A scheduled execution time may additionally be specified for each waiting job. For example, the scheduled execution time is specified by the user who requests the execution of the job.

The storage unit 11 may hold the information on the waiting jobs in such a manner that the jobs are sorted between a queue for managing jobs whose used node counts are less than or equal to the threshold and a queue for managing jobs whose used node counts exceed the threshold. The former queue manages jobs that wait until as many nodes as their used node counts become idle in the node group 21. The latter queue manages jobs that wait until as many nodes as their used node counts become idle in the node group 22. The priority may be given to the jobs in order of arrival within each queue. Therefore, it is possible to perform job scheduling for the node group 21 and for the node group 22 independently.

The processing unit 12 monitors a plurality of jobs (a plurality of first jobs) whose used node counts are less than or equal to the threshold and a plurality of jobs (a plurality of second jobs) whose used node counts exceed the threshold among waiting jobs. The processing unit 12 calculates a load value 13 indicating the load of the plurality of first jobs and a load value 14 indicating the load of the plurality of second jobs.

The load value 13 reflects the overall quantity of the plurality of first jobs. A higher load value 13 indicates a higher overall quantity of the plurality of first jobs. The load value 13 may indicate the load of the queue corresponding to the node group 21. The load value 13 may be defined as the number of first jobs that wait for execution by the node group 21. The load value 13 may be a numerical value indicating the total used node count of the plurality of first jobs. Alternatively, the load value 13 may be a numerical value obtained by multiplying the used node count and the scheduled execution time with respect to each of the plurality of first jobs and summing the products.

The load value 14 reflects the overall quantity of the plurality of second jobs. A higher load value 14 indicates a higher overall quantity of the plurality of second jobs. The load value 14 may indicate the load of the queue corresponding to the node group 22. The load value 14 may be defined as the number of second jobs that wait for execution by the node group 22. The load value 14 may be a numerical value indicating the total used node count of the plurality of second jobs. Alternatively, the load value 14 may be a numerical value obtained by multiplying the used node count and the scheduled execution time with respect to each of the plurality of second jobs and summing the products.

The processing unit 12 compares the load value 13 with the load value 14. The processing unit 12 determines whether specified load conditions including a condition that the load value 13 corresponding to the first jobs whose used node counts are less than or equal to the threshold exceeds the load value 14. The load conditions may be that the ratio of the load value 13 to the load value 14 exceeds a specified ratio greater than one (for example, 1.5). The load conditions may relate to imbalance in quantity between the first jobs whose used node counts are less than or equal to the threshold and the second jobs whose used node counts exceed the threshold. In addition, the load conditions may relate to imbalance in load between the node group 21 and the node group 22. The load conditions are satisfied in the case where a large number of first jobs temporarily occur.

In the case where the above load conditions are satisfied, the processing unit 12 combines two or more first jobs among the plurality of first jobs to thereby create a combined job 15. For creating the combined job 15, a used node count that exceeds the threshold is specified. The used node count of the combined job 15 may be determined on the basis of already-executed jobs executed in the past by the node group 22 that is to handle the combined job 15. For example, the used node count of the combined job 15 is set to the average used node count of the already-executed jobs executed by the node group 22. Alternatively, the used node count of the combined job 15 may be determined on the basis of the range of used node counts that the node group 22 handles or may be set to the median value in the range of used node counts that the node group 22 handles.

For example, the combined job 15 is created by combining as many jobs as possible greater than two as long as the total used node count of the jobs does not exceed the used node count of the combined job 15. The two or more first jobs that are combined may be selected in order of priority from the highest from the plurality of first jobs. In addition, a scheduled execution time may be specified for the combined job 15. The scheduled execution time of the combined job 15 may be set to the maximum scheduled execution time of the two or more first jobs.

In the scheduling, the combined job 15 is treated as a single job that has the above used node count specified. The combined job 15 may be called a container, a virtual job, or a logical job. In consideration of other jobs, the combined job 15 is entirely assigned to nodes in a unified manner. Note that the first jobs contained in the combined job 15 are not individually scheduled. Therefore, for example, the two or more first jobs contained in the combined job 15 start to execute at the same time.

Since the used node count of the combined job 15 exceeds the threshold, the node group 22 handles the combined job 15. When the node group 22 executes the combined job 15, the plurality of nodes assigned the combined job 15 are distributed among the two or more first jobs contained in the combined job 15. Therefore, the node group 22 may execute these two or more first jobs in the same manner as in the case where the two or more first jobs are not combined. In this case, however, the two or more first jobs contained in the combined job 15 are subject to constraints for unity in scheduling their execution start time and the nodes to be assigned. For example, the two or more first jobs combined are scheduled for the same execution start time and are assigned to consecutive nodes.

The processing unit 12 performs scheduling to cause the node group 21 to execute the remaining first jobs that have not been combined among the plurality of first jobs whose used node counts are less than or equal to the threshold. In addition, the processing unit 12 performs scheduling to cause the node group 22 to execute the combined job 15 and the plurality of second jobs whose used node counts exceed the threshold. As described above, in the latter scheduling, the combined job 15 is treated as a single job. Therefore, for example, even if there are some idle nodes available to execute only some of the two or more first jobs contained in the combined job 15, some of the first jobs do not start to execute.

The combined job 15 may be executed by the node group 22, preferentially over the plurality of second jobs whose used node counts exceed the threshold. In addition, the combined job 15 may be inserted at the head of the queue that manages the second jobs whose used node counts exceed the threshold.

As described above, the information processing apparatus 10 of the first embodiment divides a set of nodes into the node groups 21 and 22. The information processing apparatus 10 causes the node group 21 to execute small-scale jobs with small used node counts and the node group 22 to execute large-scale jobs with high used node counts. This prevents a preceding small-scale job from impeding subsequent large-scale jobs, thereby preventing a large delay in the start of execution of the large-scale jobs. As a result, the difference in waiting time between the small-scale jobs and the large-scale jobs is reduced, and the fairness is achieved among users. In addition, the overall average waiting time of jobs including the small-scale and large-scale jobs is reduced.

In the case where a large number of small-scale jobs temporarily occur, the information processing apparatus 10 detects the imbalance between the load of the small-scale jobs and the load of the large-scale jobs. The information processing apparatus 10 then combines two or more small-scale jobs to thereby create the combined job 15 and causes the node group 22 to execute the combined job 15. This prevents the waiting times of the small-scale jobs from temporarily increasing as compared with the large-scale jobs. As a result, the difference in waiting time between the small-scale jobs and the large-sale jobs is reduced, and the fairness is achieved among users. In addition, the overall average waiting time of jobs including the small-scale and large-scale jobs is reduced.

In addition, the load value 13 indicating the load of the small-scale jobs may be calculated by multiplying the used node count and the scheduled execution time with respect to each small-scale job and summing the products. The load value 14 indicating the load of the large-scale jobs may be calculated in the same way. This makes it possible to properly evaluate the loads on the node groups 21 and 22 and the waiting status for idle nodes. In addition, the load conditions may be that the ratio of the load value 13 to the load value 14 exceeds a specified ratio. This makes it possible to properly evaluate the imbalance between the load of the small-scale jobs and the load of the large-scale jobs.

In addition, the information processing apparatus 10 may determine the used node count of the combined job 15 on the basis of jobs already executed by the node group 22. This makes it possible to create an efficient schedule for the node group 22 and to improve the use efficiency of nodes in the node group 22. In addition, the information processing apparatus 10 may select small-scale jobs to be combined into the combined job 15 in order of priority from the highest and may give the highest priority to the combined job 15 for execution by the node group 22. This makes it possible to achieve the fairness among jobs with different arrival times.

Second Embodiment

A second embodiment will now be described.

Figure 2:
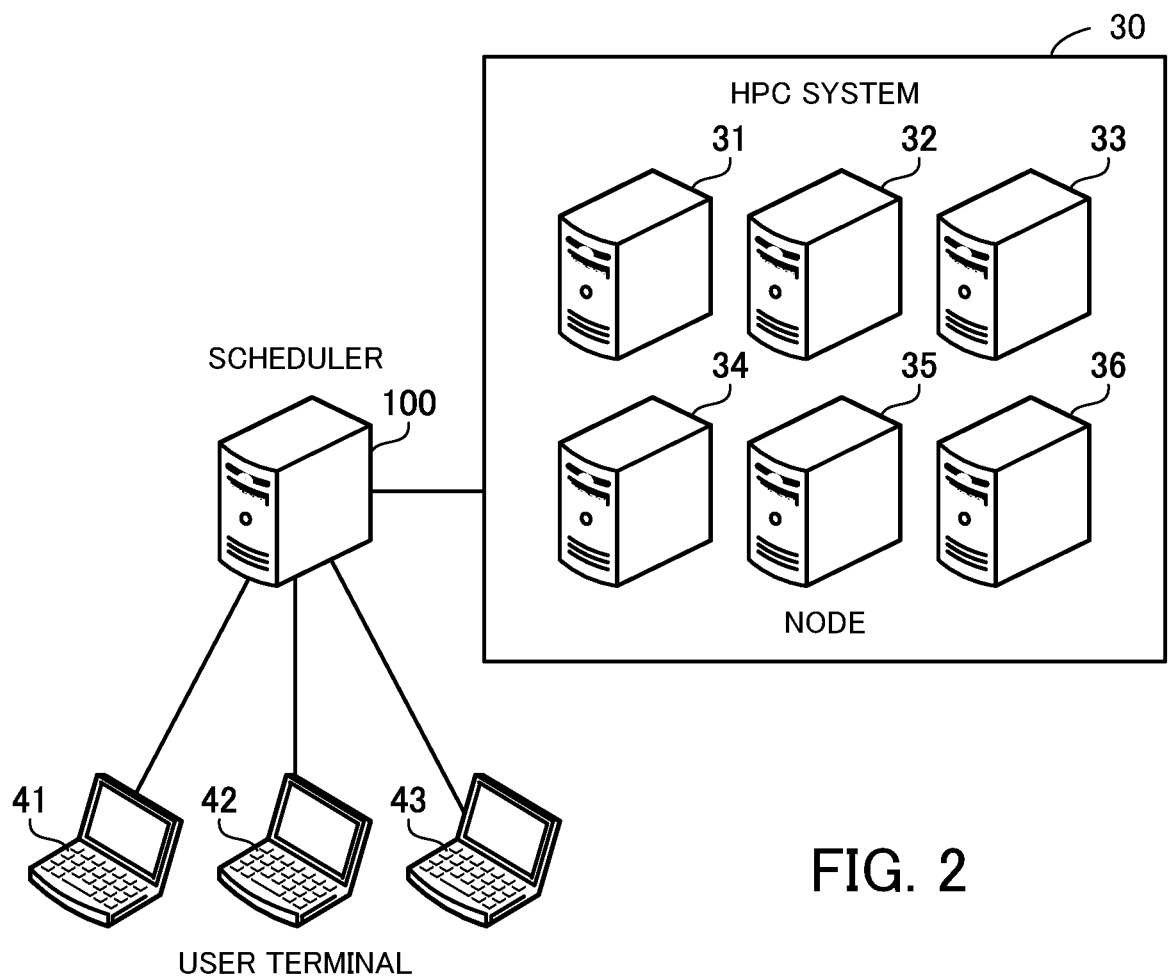
FIG. 2 illustrates an example of an information processing system according to a second embodiment.

FIG. 2 illustrates an example of an information processing system according to the second embodiment.

The information processing system of the second embodiment includes an HPC system 30, a plurality of user terminals, and a scheduler 100. The plurality of user terminals include user terminals 41, 42, and 43. Each user terminal 41, 42, and 43 and the scheduler 100 communicate with each other over a network such as the Internet. The HPC system 30 and the scheduler 100 communicate with each other over a network such as a local area network (LAN).

The HPC system 30 is a large-scale information processing system that executes a plurality of jobs in parallel. The HPC system 30 includes a plurality of nodes including nodes 31, 32, 33, 34, 35, and 36. The HPC system 30 includes nodes corresponding to the node groups 21 and 22 of the first embodiment. Each node has a processor (may be a processor core) and a memory and runs programs on the processor. Each node is given a node number as an identifier identifying the node. The plurality of nodes may be connected over an interconnect network in a mesh or torus topology. Two or more nodes may execute two or more processes that form a single job, in parallel.

The user terminals 41, 42, and 43 are client devices that are used by users of the HPC system 30. When a user terminal 41, 42, or 43 causes the HPC system 30 to execute a job, the user terminal 41, 42, or 43 sends a job request requesting the execution of the job to the scheduler 100. The job request specifies a path to a program for activating the job, the number of nodes used for executing the job (hereinafter, referred to as the "used node count" of the job), and the maximum execution time of the job. The user may be charged according to the used node count or the maximum execution time. In the case where the job is not completed within the maximum execution time after the start of the job, the HPC system 30 may stop the job forcibly.

The scheduler 100 is a server device that performs job scheduling. The scheduler 100 corresponds to the information processing apparatus 10 of the first embodiment. The scheduler 100 manages a plurality of job requests received from the plurality of user terminals in a queue. In principle, the priority of jobs is set in order of arrival of their job requests. The scheduler 100 also monitors the use status of each node of the HPC system 30.

The scheduler 100 selects, for each job, as many idle nodes as the used node count specified by the job from the HPC system 30, in order from a job with the highest priority, and assigns the job to the selected nodes. The scheduler 100 notifies the HPC system 30 of the scheduling result and causes the selected nodes to execute the program for the job. Note that unexecuted jobs may remain in the queue due to a lack of idle nodes. In this case, these jobs wait until as many nodes as needed become idle.

Figure 3:
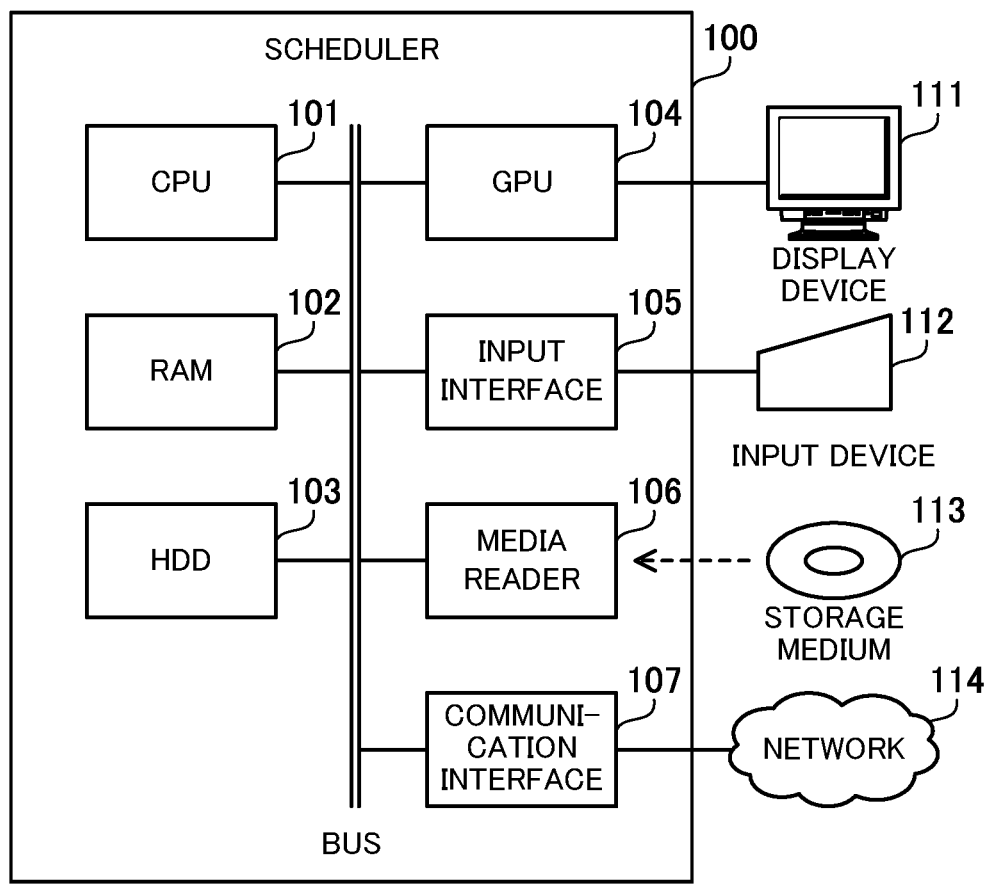
FIG. 3 illustrates a block diagram illustrating an example of hardware configuration of a scheduler.

FIG. 3 illustrates a block diagram illustrating an example of hardware configuration of the scheduler.

The scheduler 100 includes a CPU 101, a RAM 102, an HDD 103, a GPU 104, an input interface 105, a media reader 106, and a communication interface 107, which are connected to a bus. The nodes 31, 32, 33, 34, 35, and 36 and the user terminals 41, 42, and 43 may have the same hardware configuration as the scheduler 100. In this connection, the CPU 101 corresponds to the processing unit 12 of the first embodiment. The RAM 102 or HDD 103 corresponds to the storage unit 11 of the first embodiment.

The CPU 101 is a processor that executes program commands. The CPU 101 loads at least part of a program and data from the HDD 103 to the RAM 102 and executes the program. The scheduler 100 may be provided with a plurality of processors. A set of multiple processors may be called "a multiprocessor," or simply "a processor."

The RAM 102 is a volatile semiconductor memory that temporarily holds programs executed by the CPU 101 and data used by the CPU 101 in processing. The scheduler 100 may be provided with a different kind of memory than RAM or a plurality of memories.

The HDD 103 is a non-volatile storage device that holds software programs such as operating system (OS), middleware, and application software, and data. The scheduler 100 may be provided with a different kind of storage device such as a flash memory or a solid state drive (SSD) or a plurality of storage devices.

The GPU 104 outputs images to a display device 111 connected to the scheduler 100 in accordance with commands from the CPU 101. Any kind of display device such as a cathode ray tube (CRT) display, a liquid crystal display, an organic electro-luminescence (EL) display, or a projector may be used as the display device 111. Other than the display device 111, an output device such as a printer may be connected to the scheduler 100.

The input interface 105 receives input signals from an input device 112 connected to the scheduler 100. Any kind of input device such as a mouse, a touch panel, a touchpad, or a keyboard may be used as the input device 112. A plurality of kinds of input devices may be connected to the scheduler 100.

The media reader 106 is a reading device that reads programs and data from a storage medium 113. Any kind of storage medium, i.e., a magnetic disk such as a flexible disk (FD) or an HDD, an optical disc such as a compact disc (CD) or a digital versatile disc (DVD), or a semiconductor memory may be used as the storage medium 113. For example, the media reader 106 copies, for example, a program and data read from the storage medium 113 to another storage medium such as the RAM 102 or the HDD 103. The read program is executed by the CPU 101, for example. The storage medium 113 may be a portable storage medium and may be used to distribute programs and data. In addition, the storage medium 113 and HDD 103 may be referred to as computer-readable storage media.

The communication interface 107 is connected to a network 114 and communicates with the nodes 31, 32, 33, 34, 35, and 36 and the user terminals 41, 42, and 43 over the network 114. The communication interface 107 may be a wired communication interface that is connected to a wired communication device such as a switch or a router or may be a wireless communication interface that is connected to a wireless communication device such as a base station or an access point.

The following describes job scheduling.

Figure 4:
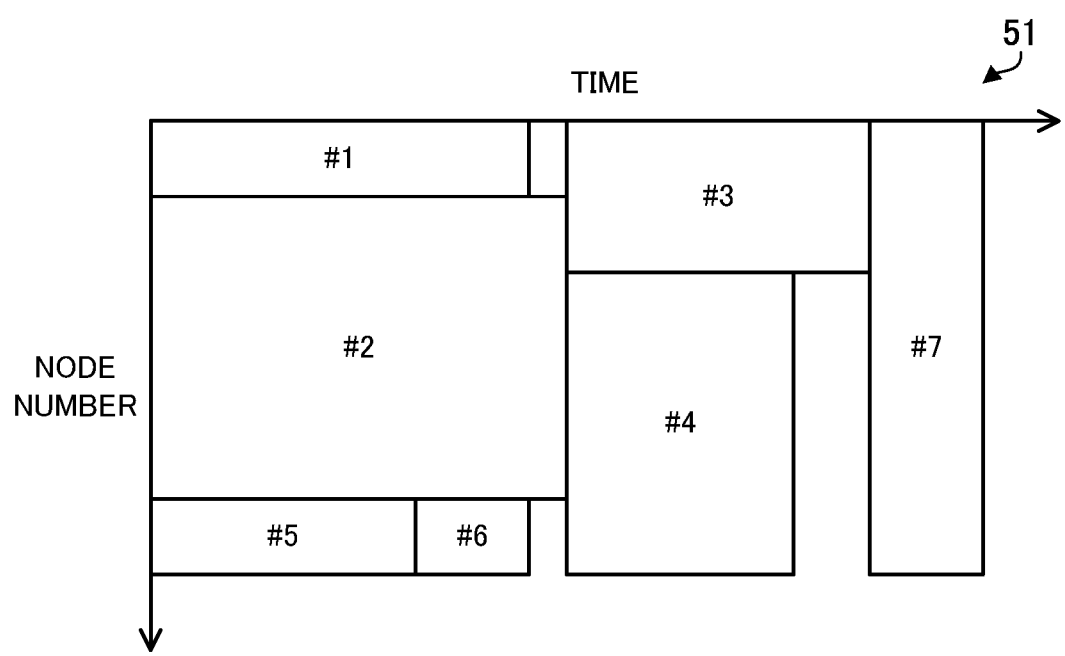
FIG. 4 illustrates a first example of scheduling result.

FIG. 4 illustrates a first example of scheduling result.

The graph 51 represents a result of assigning a plurality of jobs to nodes. The vertical axis of the graph 51 represents node number, whereas the horizontal axis thereof represents time. The node number decreases as the vertical axis goes upward, and the node number increases as the vertical axis goes downward. The further to the left on the horizontal axis, the older the time, and the further to the right on the horizontal axis, the newer the time. The scheduler 100 manages computing resources in the two-dimensional plane of node×time and allocates each job a rectangular resource area.

The scheduler 100 performs scheduling using a bottom left fill (BLF) algorithm. The BLF algorithm first defines an entire rectangular space in which a plurality of rectangular blocks are to be placed and gives priority to the plurality of rectangular blocks. The BLF algorithm places the rectangular blocks one by one in the entire space, in order from a rectangular block with the highest priority. At this time, the BLF algorithm places a rectangular block at the most bottom (lowest) and most left part within the entire space without overlapping any other already-placed rectangular block.

By doing so, the rectangular block is placed at the lowest and most left part of the entire space. A position where the rectangular block is not able to be moved any further to the left or downward may be called a bottom left (BL) stable point. The BLF algorithm places each of the plurality of rectangular blocks at its BL stable point, in order of priority.

The vertical axis of the graph 51 corresponds to the bottom of the BLF algorithm, whereas the horizontal axis thereof corresponds to the left side of the BLF algorithm. With this, in principle, the scheduler 100 assigns the plurality of jobs to nodes in order of priority in such a manner that the jobs start as early as possible. In the case where there are a plurality of possible assignments in which a job starts at the same start time, the scheduler 100 assigns the job to nodes with the lowest node numbers.

In this connection, the scheduler 100 uses a backfill algorithm together with the BLF algorithm. The backfill algorithm may assign a small-scale job with low priority to nodes prior to a large-scale job with high priority. In the case where a job with high priority is a large-scale job that uses a large number of nodes, there may be a lack of idle nodes, which does not allow the job to start at this point in time. However, in the case where a job with low priority is a small-scale job that uses a small number of nodes, this job may be possible to start at the point in time. In this case, the backfill algorithm assigns the small-scale job with low priority to node first, to reduce the number of idle nodes that are wasteful.

The graph 51 represents a scheduling result of the jobs #1 to #7 of different scales. The scheduler 100 has received job requests for the jobs #1 to #7 in this order. Therefore, the jobs #1 to #7 are arranged in order of priority from the highest.

The scheduler 100 first assigns the job #1 to nodes, then the job #2 to nodes with node numbers higher than those for the job #1. The number of idle nodes is not enough to execute either the job #3 or #4 but is enough to execute the job #5 during the execution of the jobs #1 and #2. Therefore, the scheduler 100 assigns the job #5 to nodes with node numbers higher than those for the jobs #1 and #2 with the backfill algorithm.

The jobs #1 and #2 are not yet completed when the job #5 is completed. At this time, the number of idle nodes is not enough to execute either the job #3 or #4 but is enough to execute the job #6. At this time, the scheduler 100 assigns the job #6 to nodes with the backfill algorithm. The job #2 is not yet completed when the jobs #1 and #6 are completed. At this time, the number of idle nodes is still not enough to execute the job #3, #4, or #7. Therefore, the scheduler 100 waits for the completion of the job #2.

When the job #2 is completed, the scheduler 100 assigns the job #3 to nodes and the job #4 to nodes with node numbers higher than those for the job #3. During the execution of the jobs #3 and #4, the number of idle nodes is not enough to execute the job #7. Even after the job #4 is completed, the number of idle nodes is still not enough to execute the job #7. Therefore, the scheduler 100 assigns the job #7 to nodes after the job #3 is completed.

In the way described above, the use of the BLF algorithm and backfill algorithm together enables the scheduler 100 to reduce the number of idle nodes that are wasteful in the HCP system 30 and improve the occupancy rate of the HCP system 30. The occupancy rate is defined as the ratio of the number of nodes executing jobs to the total number of nodes. A higher occupancy rate is desirable for the administrator of the HCP system 30.

In the backfill algorithm, however, early execution of a small-scale job may impede the scheduling of large-scale jobs and thus cause a delay in the execution of the large-scale jobs. Therefore, a waiting time after the scheduler 100 receives a job request for the large-scale job before the large-scale job starts may significantly be long. A short average waiting time is desirable for the users of the HCP system 30. In addition, if jobs have greatly different waiting times, the users might have a suspicion about the fairness of the scheduling.

To deal with this, the scheduler 100 divides the set of nodes provided in the HCP system 30 into a plurality of groups and assigns jobs of different scales to different groups. The scheduler 100 performs scheduling using the BLF algorithm and backfill algorithm within each group. This approach reduces influences between the jobs of scales and prevents early execution of a small-scale job from causing a delay in execution of large-scale jobs. As a result, the balance between the occupancy rate the administrator cares about and the waiting time the users care about is achieved. In the following description, divided node groups may be called "clusters."

Figure 5:
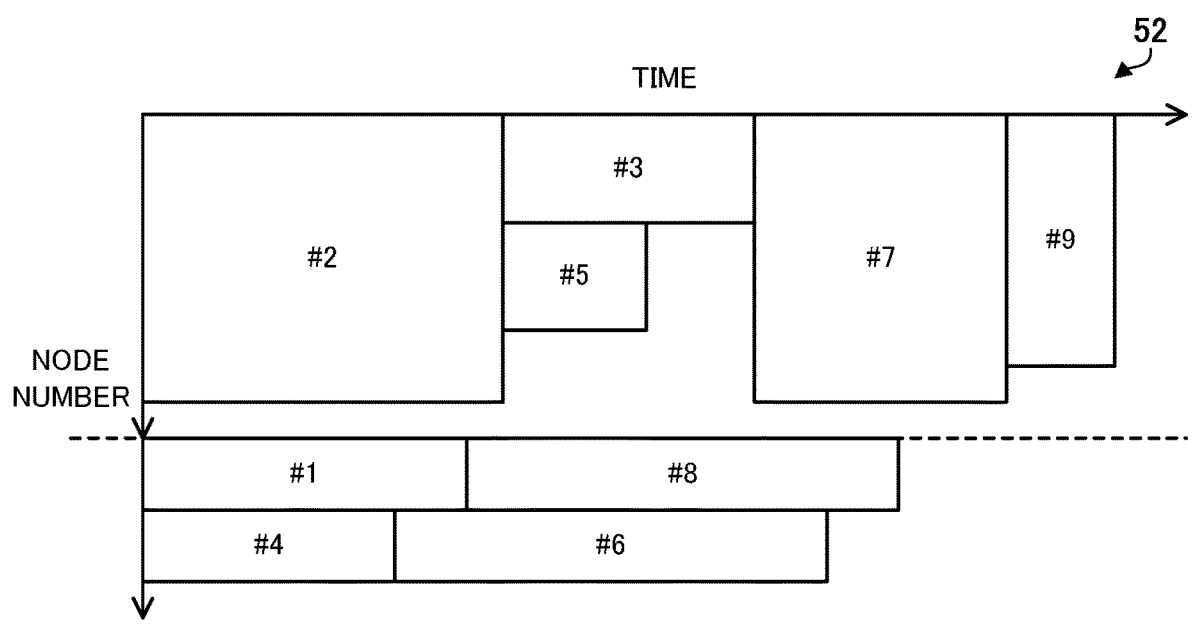
FIG. 5 illustrates a second example of scheduling result.

FIG. 5 illustrates a second example of scheduling result.

The graph 52 represents a result of assigning a plurality of jobs to nodes, as in the graph 51. The vertical axis of the graph 52 represents node number, whereas the horizontal axis thereof represents time. In this case, the set of nodes in the HPC system 30 is divided into two clusters. Out of the two clusters, one cluster with lower node numbers is used for large-scale jobs that use large numbers of nodes, and the other cluster with higher node numbers is used for small-scale jobs that use small numbers of nodes.

The graph 52 represents a scheduling result of jobs #1 to #9 of different scales. The scheduler 100 has received job requests for the jobs #1 to #9 in this order. The jobs #1 to #9 are arranged in order of priority from the highest. The scheduler 100 classifies the jobs #1 to #9 as large-scale jobs and small-scale jobs. In this connection, the large-scale jobs are jobs whose used node counts exceed a threshold, and the small-scale jobs are jobs whose used node counts are less than or equal to the threshold. The jobs #2, #3, #5, #7, and #9 are large-scale jobs, and the jobs #1, #4, #6, and #8 are small-scale jobs. The scheduler 100 may manage the jobs using a plurality of queues respectively corresponding to different ranges of used node counts.

The scheduler 100 performs scheduling of the jobs #2, #3, #5, #7, and #9 within the cluster with low node numbers. Here, the scheduler 100 first assigns the job #2 to nodes, and when the job #2 is completed, the scheduler 100 assigns the jobs #3 and #5 to nodes. When the jobs #3 and #5 are completed, the scheduler 100 assigns the job #7 to nodes, and when the job #7 is completed, the scheduler 100 assigns the job #9 to nodes.

In addition, the scheduler 100 performs scheduling of the jobs #1, #4, #6, and #8 within the cluster with high node numbers. Here, the scheduler 100 first assigns the jobs #1 and #4 to nodes. When the job #4 is completed, the scheduler 100 assigns the job #6 to nodes. When the job #1 is completed, the scheduler 100 assigns the job #8 to nodes.

As described above, to divide the set of nodes provided in the HPC system 30 into two clusters reduces the waiting times of large-scale jobs and thus reduces the average waiting time. In this connection, to divide the set of nodes into three or more clusters may further reduce the waiting times. An increase in the division count may reduce the average waiting time and the maximum waiting time.

If the division count is too large, however, the use efficiency of nodes may decrease, the number of idle nodes that are wasteful may increase, and the occupancy rate of the HPC system 30 may decrease. To deal with these, the scheduler 100 dynamically changes the division count on the basis of the most recent execution history of jobs. After that, according to the changed division count, the scheduler 100 calculates ranges of used node counts to be handled respectively by the new clusters and determines the cluster size of each cluster. In this connection, the cluster size of a cluster indicates the number of nodes belonging to the cluster.

Figure 6:
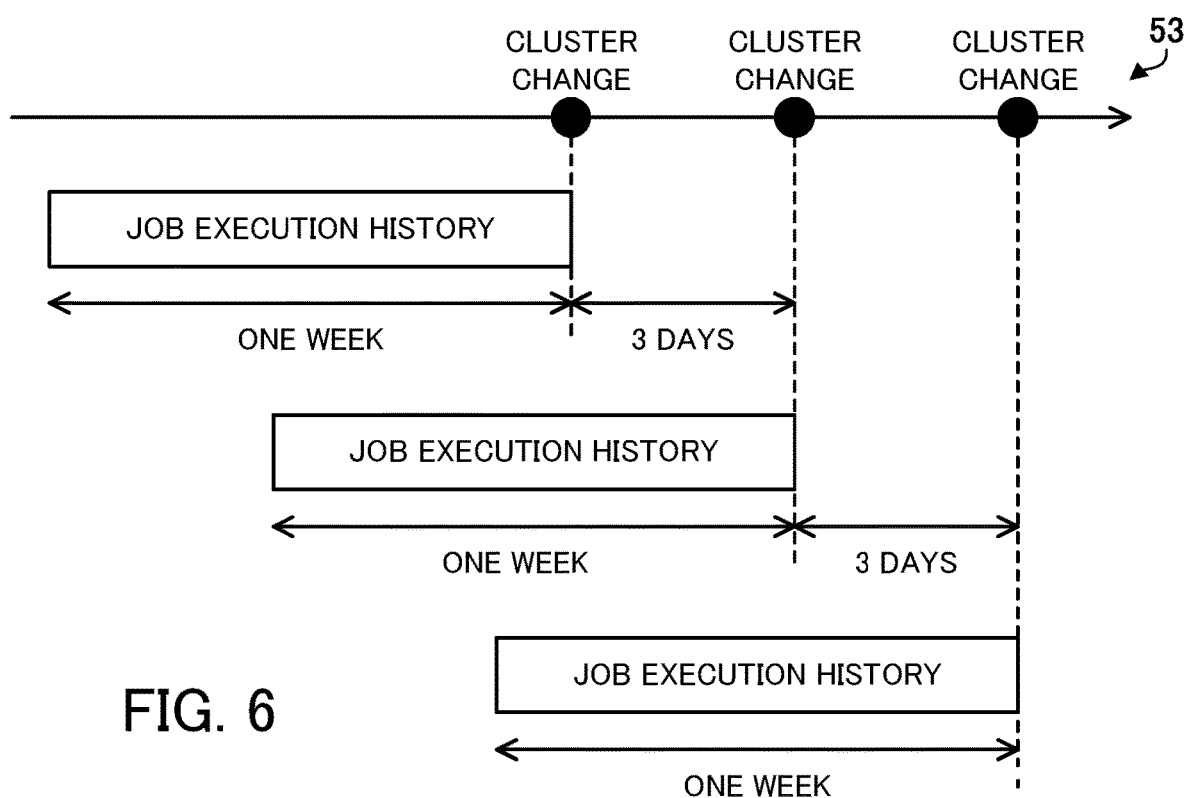
FIG. 6 illustrates an example of timing of cluster changes.

FIG. 6 illustrates an example of timing of cluster changes.

The scheduler 100 changes clusters on a periodic basis. For example, as seen in the graph 53, the scheduler 100 changes clusters every three days. In the cluster change, the scheduler 100 analyzes a job execution history of the most recent one week and determines the number of clusters, their ranges of used node counts, and their cluster sizes. Therefore, the job execution history referenced in a cluster change and the job execution history referenced in the next cluster change overlap for four days.

In this connection, for example, the job execution history of the most recent one week is information on jobs completed within one week before an analysis day. Alternatively, the job execution history of the most recent one week may be information on jobs whose start falls within one week before the analysis day or information on jobs whose acceptance by the scheduler 100 falls within one week before the analysis day.

In the cluster change, the scheduler 100 first determines the number of clusters, second determines a range of used node counts for each cluster, and third determines the cluster size of each cluster. To determine the number of clusters, the scheduler 100 calculates the waiting time difference of each existing cluster.

Figure 7:
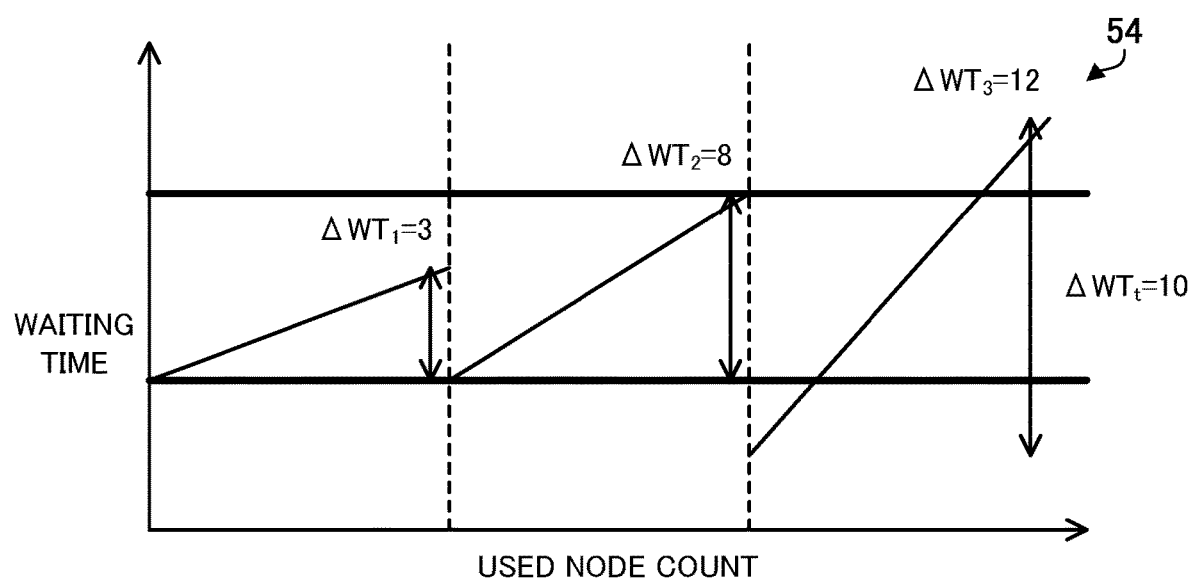
FIG. 7 depicts a graph representing an example of the waiting time differences of clusters.

FIG. 7 depicts a graph representing an example of the waiting time differences of clusters.

The graph 54 represents the actual waiting times of jobs executed within the most recent one week. The vertical axis of the graph 54 represents waiting time, whereas the horizontal axis thereof represents the used node count of a job. The scheduler 100 classifies the waiting times of the plurality of jobs executed within the most recent week according to the clusters that have executed the jobs. Thereby, a distribution of waiting time is computed for each cluster. The scheduler 100 calculates the waiting time difference between the maximum and minimum values of the waiting times for each cluster.

The graph 54 represents a distribution of waiting time in the case where the number of clusters is three. As seen in the example of the graph 54, a waiting time difference $\Delta WT_1$ of 3 hours is calculated for a cluster that handles jobs with small used node counts. A waiting time difference $\Delta WT_2$ of 8 hours is calculated for a cluster that handles jobs with medium used node counts. A waiting time difference $\Delta WT_3$ of 12 hours is calculated for a cluster that handles jobs with high used node counts.

The administrator of the HPC system 30 previously sets a threshold $\Delta WT_t$ for the waiting time difference. The threshold $\Delta WT_t$ indicates an acceptable variation in waiting time for the administrator. For example, the threshold $\Delta WT_t$ is set to 10 hours. The scheduler 100 compares the waiting time difference $\Delta WT_i$ of each cluster with the threshold $\Delta WT_t$. If the waiting time difference $\Delta WT_i$ of at least one cluster exceeds the threshold $\Delta WT_t$, the scheduler 100 increases the number of clusters by one. By doing so, a decrease in the waiting time difference of each cluster is expected. If the waiting time differences $\Delta WT_i$ of all clusters are less than the threshold $\Delta WT_t$, the scheduler 100 decreases the number of clusters by one. This is because the current number of clusters may be too large and this may decrease the occupancy rate of the HPC system 30.

In this connection, the above-described method of using the waiting time differences of a plurality of clusters is just an example. The scheduler 100 may employ another method. For example, in the case where a certain proportion of the clusters have waiting time differences exceeding the threshold, the scheduler 100 may increase the number of clusters by one. In addition, the scheduler 100 may set a threshold for determining to increase the number of clusters and a threshold for determining to decrease the number of clusters separately so as not to repeat the increase and decrease in the number of clusters within a short period of time.

When the number of clusters is determined, the scheduler 100 calculates ranges of used node counts as conditions for jobs to be assigned to the respective clusters, on the basis of the number of clusters.

Figure 8:
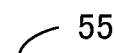
FIG. 8 illustrates an example of a table indicating used node count conditions.

FIG. 8 illustrates an example of a table indicating used node count conditions.

The scheduler 100 calculates, for each cluster, a range of used node counts in such a manner that the plurality of clusters have equal job granularity. In the second embodiment, the "job granularity" is the ratio of the lower limit to the upper limit in a range of used node counts. A high job granularity means that jobs executed in the same cluster have small differences in the used node count. A low job granularity means that jobs executed in the same cluster have large differences in the used node count. As the job granularity increases, the average waiting time of jobs decreases. To equalize the job granularity among the plurality of clusters minimizes the average waiting time over all the clusters.

Here, the upper limit $N_z$ on the used node count of a job that a cluster Z is to handle is defined as $N^{\wedge}(Z/X)$, where N denotes the maximum value for the used node count specified by a job, X denotes the number of clusters, and Z (Z=1 to X) denotes a cluster number. With this definition, the X clusters have equal job granularity.

The table 55 represents the correspondence relationship among the number of clusters, job granularity, and ranges of used node counts set for the respective clusters in the case of N=10000. The scheduler 100 may hold the table 55 and change the clusters with reference to the table 55. Alternatively, the scheduler 100 may change the clusters using the above equation, without holding the table 55.

In the case of N=10000 and X=2, the job granularity is equal to 0.01. In this case, the used node counts that the cluster 1 handles range from 1 to 100, inclusive, the used node counts that the cluster 2 handles range from 101 to 10000, inclusive. In the case of N=10000 and X=3, the job granularity is equal to 0.022. In this case, the used node counts that the cluster 1 handles range from 1 to 46, inclusive, and the used node counts that the cluster 2 handles range from 47 to 2154, inclusive, and the used node counts that the cluster 3 handles range from 2155 to 10000. In the case of N=10000 and X=4, the job granularity is equal to 0.1. In this case, the used node counts that the cluster 1 handles range from 1 to 10, inclusive, and the used node counts that the cluster 2 handles range from 11 to 100, inclusive, the used node counts that the cluster 3 handles range from 101 to 1000, and the used node counts that the cluster 4 handles range from 1001 to 10000.

After determining the number of clusters and a range of used node counts for each cluster, the scheduler 100 determines the number of nodes to be included in each cluster on the basis of a job execution history. The scheduler 100 estimates the load of each new cluster and distributes the nodes among the clusters in such a manner that the number of nodes is in proportion to the estimated load.

More specifically, the scheduler 100 re-distributes a plurality of jobs executed within the most recent one week among the plurality of new clusters according to their used node counts. In addition, the scheduler 100 calculates, with respect to each of the plurality of jobs executed within the most recent one week, the product of the used node count and the actual execution time as a load value. The actual execution time of a job is an actual elapsed time between the start and the end of the job. If a job is interrupted halfway, the execution time of the job does not need to include the interruption time. The scheduler 100 sums the load values of the jobs belonging to each of the plurality of new clusters to thereby calculate the total load value of each cluster. The scheduler 100 determines the number of nodes to be included in each of the plurality of clusters in such a manner that the number of nodes is in proportion to the total load value.

For example, assume that the HPC system 30 includes 50000 nodes and that the total load value of the cluster 1 is 500000 (the number of nodes×time), the total load value of the cluster 2 is 200000 (the number of nodes×time), and the total load value of the cluster 3 is 300000 (the number of nodes×time). In this case, the ratio of these three clusters in terms of the total load value is 50%: 20%: 30%. Therefore, for example, the scheduler 100 determines that the number of nodes in the cluster 1 is 25000, the number of nodes in the cluster 2 is 10000, and the number of nodes in the cluster 3 is 15000.

In this connection, it is preferable that the scheduler 100 adjust the cluster size of each cluster so that the upper limit on the used node count ("used node count upper limit") of a job that the cluster is to handle and the cluster size satisfy a predetermined constraint condition. In many cases, when the cluster size is greater than twice the used node count upper limit, the occupancy rate and average waiting time are almost constant. If the cluster size becomes less than twice the used node count upper limit, however, the occupancy rate rapidly decreases and the average waiting time rapidly increases.

Therefore, when determining the cluster size of each cluster, the scheduler 100 sets the lower limit of the cluster size to twice the upper limit on the used node count of a job that the cluster is to handle. In the case where the cluster size of a cluster calculated based on the ratio in terms of total load value is below the lower limit, the scheduler 100 adjusts the cluster size of the cluster to the lower limit. In this case, the scheduler 100 adjusts the cluster sizes of the other clusters accordingly in such a manner that the cluster size of each of the other clusters is in proportion to the total load value.

For example, in the above calculation example, the number of nodes in the cluster 3 is calculated as 15000, less than twice the upper limit of 10000 on the used node count of a job that the cluster 3 is to handle. Therefore, the scheduler 100 adjusts the number of nodes in the cluster 3 to 20000. Then, the scheduler 100 distributes the remaining 30000 nodes between the clusters 1 and 2 at their ratio in terms of total load value. By doing so, the number of nodes in the cluster 1 is adjusted to 21429, and the number of nodes in the cluster 2 is adjusted to 8571. The adjusted number of nodes in each cluster 1 and 2 satisfies the above constraint condition.

The following describes a temporary increase in the load of each cluster.

As described above, the scheduler 100 determines the division count, the range of used node counts for each cluster, and the cluster size of each cluster with reference to a job execution history of the most recent one week. This means that the division count, ranges of used node counts, and cluster sizes are adjusted so as to reduce the average waiting time over a long period of time. In this connection, jobs whose used node counts fall in a specific range of used node counts may be concentrated in a short period of time. If this happens, the waiting time may greatly increase temporarily only in a specific cluster among the plurality of clusters. This may cause a temporary significant imbalance in the waiting time among jobs with different used node counts, which loses the fairness among users. To deal with this, the scheduler 100 uses "containers," as will be described below, to eliminate the temporary increase in the waiting time.

Figure 9:
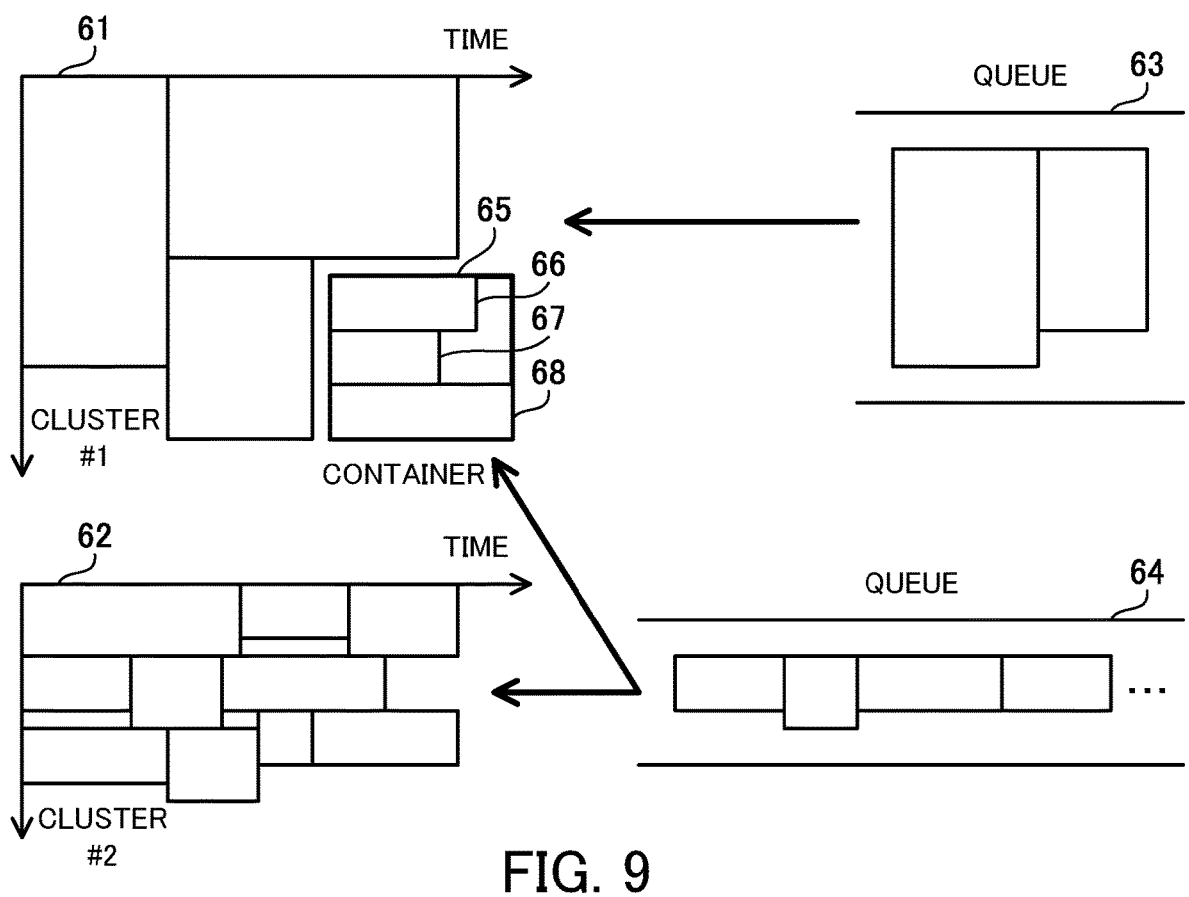
FIG. 9 illustrates an example of transferring jobs to another cluster by means of containerization.

FIG. 9 illustrates an example of transferring jobs to another cluster by means of containerization.

For simple description, assume now that the HPC system 30 is divided in clusters 61 and 62. The cluster 61 handles large-scale jobs whose used node counts exceed a threshold, whereas the cluster 62 handles small-scale jobs whose used node counts are less than or equal to the threshold. The scheduler 100 has a queue 63 for holding the large-scale jobs waiting for execution in order of arrival, and a queue 64 for holding the small-scale jobs waiting for execution in order of arrival.

The scheduler 100 performs scheduling to assign the large-scale jobs placed in the queue 63 to the nodes of the cluster 61. The scheduler 100 also performs scheduling to assign the small-scale jobs placed in the queue 64 to the nodes of the cluster 62. Here, there is a case where the number of small-scale jobs placed in the queue 64 rapidly increases in a short period of time.

The scheduler 100 calculates the queue load value of each queue 63 and 64 on a periodic basis (for example, every five minutes). The scheduler 100 multiplies, as a load value, the used node count and the maximum execution time with respect to each large-scale job placed in the queue 63 and sums the load values of the large-scale jobs as the queue load value of the queue 63. Similarly, the scheduler 100 multiplies, as a load value, the used node count and the maximum execution time with respect to each small-scale job placed in the queue 64 and sums the load values of the small-scale jobs as the queue load value of the queue 64.

The scheduler 100 determines whether the queue load value of the queue 64 exceeds 1.5 times that of the queue 63. If this condition is satisfied, the scheduler 100 creates a container 65. The container 65 may be called a combined job, a virtual job, or a logical job. The container 65 corresponds to the combined job 15 of the first embodiment.

The used node count of the container 65 is set to the average used node count of jobs executed in the past by the cluster 61. Therefore, the container 65 is treated as a large-scale job and is assigned to the cluster 61. The average used node count of the cluster 61 may be calculated at the time of cluster change, which is performed every three days, periodically at timing independent of the cluster change, or in real-time. The scheduler 100 extracts small-scale jobs in order from one at the head of the queue 64, puts as many small-scale jobs as possible in the container 65 as long as the total used node count does not exceed the used node count of the container 65. The maximum execution time of the container 65 is the maximum value of the maximum execution times of the small-scale jobs contained in the container 65.

Here, jobs 66, 67, and 68 are contained in the container 65. The scheduler 100 inserts the container 65 at the head of the queue 63. Thereby, the container 65 is preferentially assigned to nodes of the cluster 61. After that, the scheduler 100 updates the queue load values of the queues 63 and 64. The scheduler 100 repeatedly performs the containerization until the queue load value of the queue 64 becomes equal to or less than 1.5 times that of the queue 63.

The container 65 is a single unit for scheduling, and is subject to the constraint where the jobs 66, 67, and 68 contained in the container 65 are scheduled for execution in a unified manner, not separately. The jobs 66, 67, and 68 are scheduled for the same execution start time. In addition, the jobs 66, 67, and 68 are assigned to nodes with consecutive node numbers under the BLF algorithm. For example, the nodes with consecutive node numbers are nodes physically close to each other.

In addition, even if one job contained in the container 65 is completed earlier than the others, the nodes that have executed the one job are not freed until the other jobs contained in the container 65 are completed. When all the jobs 66, 67, and 68 contained in the container 65 are completed, the scheduler 100 frees all the nodes assigned to the container 65. Since the nodes assigned to the container 65 are distributed among the jobs 66, 67, and 68, the cluster 61 just executes the jobs 66, 67, and 68 in the same manner as for ordinary jobs.

If the small-scale jobs placed in the queue 64 are transferred from the cluster 62 to the cluster 61 without containerization, it means that the cluster 61 temporarily handles both the small-scale jobs and large-scale jobs. If scheduling is performed for the mixture of the small-scale jobs and large-scale jobs, the small-scale jobs may impede the large-scale jobs and thus the large-scale jobs may have a long waiting time. As a result, the waiting time in the queue 63 temporarily becomes long. By contrast, the containerization of the small-scale jobs makes it possible to maintain the effect of the cluster division.

In the case where the division count is three or more, the scheduler 100 determines whether the maximum queue load value exceeds 1.5 times the minimum queue load value. If this condition is satisfied, the scheduler 100 containerizes jobs placed in the queue with the maximum queue load value. The created container is assigned to a cluster corresponding to the smallest queue load value among clusters that handle higher used node counts the cluster corresponding to the maximum queue load value.

The following describes the functions and operations of the scheduler 100.

Figure 10:
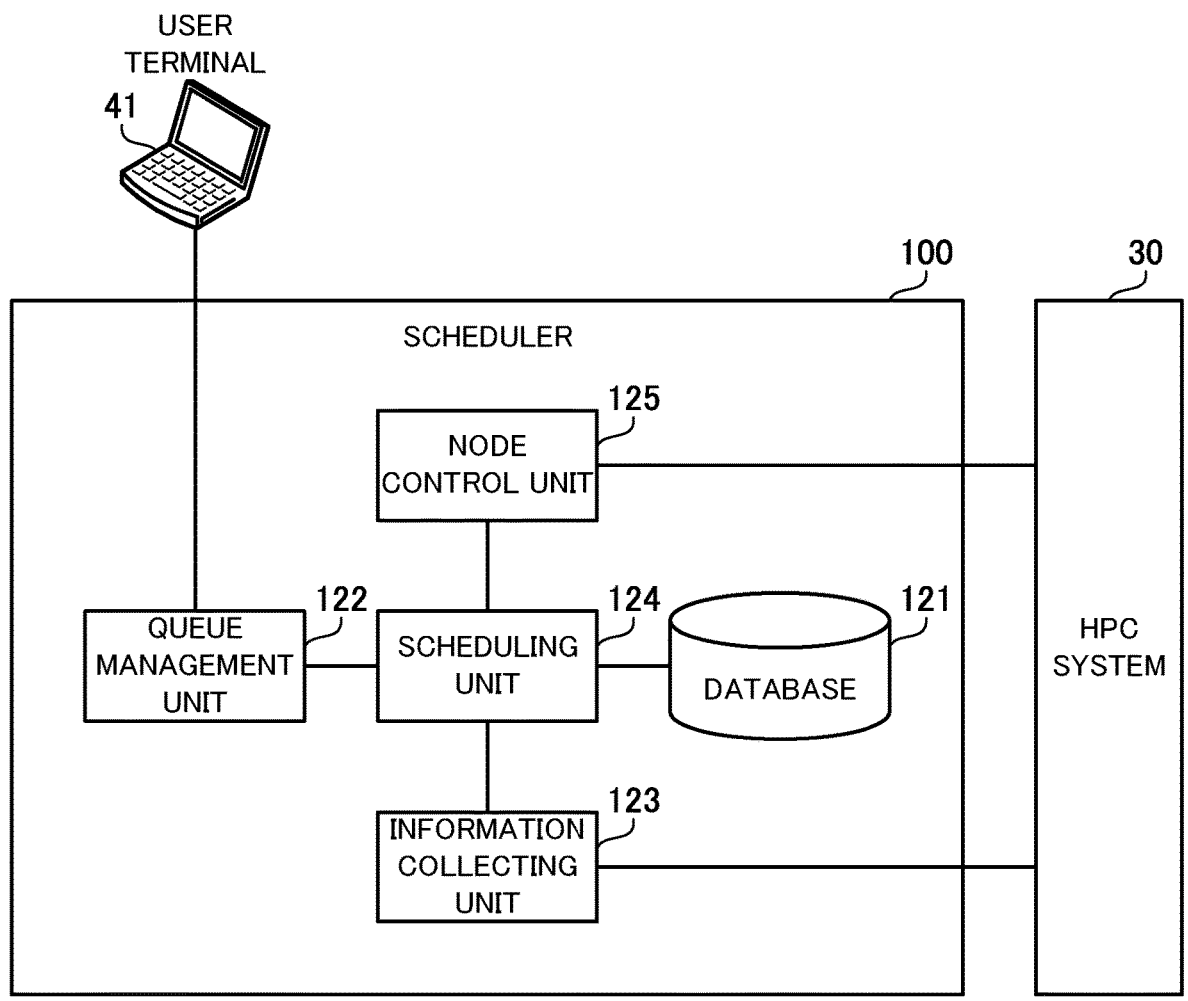
FIG. 10 illustrates a block diagram illustrating an example of functions of the scheduler.

FIG. 10 illustrates a block diagram illustrating an example of functions of the scheduler.

The scheduler 100 has a database 121, a queue management unit 122, an information collecting unit 123, a scheduling unit 124, and a node control unit 125. The database 121 is implemented by using a storage space of the RAM 102 or HDD 103, for example. The queue management unit 122, information collecting unit 123, scheduling unit 124, and node control unit 125 are implemented by the CPU 101 executing the intended programs.

The database 121 holds cluster information indicating a range of nodes belonging to each divided cluster and a range of used node counts set for each divided cluster. The database 121 also holds node information indicating the current use status of each node provided in the HCP system 30. The database 121 also holds history information indicating a history of jobs executed in the past.

In addition, the database 121 stores container information indicating the correspondence relationship between a container and jobs contained in the container.

The database 121 also stores queue management information indicating the average used node counts and queue load values of a plurality of queues corresponding to a plurality of clusters.

The queue management unit 122 receives job requests from user including the user terminals terminals 41, 42, and 43. The queue management unit 122 manages a plurality of queues corresponding to a plurality of clusters determined by the scheduling unit 124. The queue management unit 122 inserts a received job request at the end of the queue corresponding to the specified used node count. The queue management unit 122 extracts a job request from a queue in response to a request from the scheduling unit 124 and outputs the job request to the scheduling unit 124.

In addition, the queue management unit 122 receives a job request for a container from the scheduling unit 124. For example, the job request for the container specifies the used node count of the container, the maximum execution time of the container, and a plurality of jobs contained in the container. The queue management unit 122 inserts the job request for the container at the head of the queue corresponding to a cluster specified by the scheduling unit 124.

The information collecting unit 123 collects node information indicating the latest use status of each node from the HPC system 30. The node information indicates whether each node currently executes a job and also indicates, when a node currently executes a job, the identifier of the currently executed job. The information collecting unit 123 detects the starts and ends of jobs, and when detecting the start or end of a job, collects updated node information. For example, when a job starts or ends, the nodes in the HPC system 30 notify the scheduler 100 of this event. Then, the scheduler 100 requests each node of the HPC system 30 to provide the current status of the node.

Each time the scheduling unit 124 detects the start or end of a job, the scheduling unit 124 performs scheduling to assign waiting jobs to nodes. The scheduling unit 124 extracts a job request from the queue management unit 122 with respect to each of the plurality of clusters and performs scheduling using the BLF algorithm and backfill algorithm. The scheduling for the plurality of clusters may be performed independently and in parallel. After assigning a waiting job in a queue to idle nodes, the scheduling unit 124 notifies the node control unit 125 of the assignment result.

In addition, the scheduling unit 124 updates the cluster information on a periodic basis. The scheduling unit 124 calculates the waiting time difference of each of the plurality of clusters on the basis of the waiting times of jobs executed in the past and changes the number of clusters on the basis of the waiting time differences. Then, the scheduling unit 124 determines the ranges of used node counts to be handled respectively by the clusters on the basis of the number of clusters and the maximum value for the used node count of a job. Then, the scheduling unit 124 determines the cluster size of each cluster on the basis of the used node counts and execution times of the past jobs and the ranges of used node counts to be handled respectively by the clusters. The result of the cluster change is applied to jobs that are to be executed thereafter and is not applied to currently executed jobs.

In addition, the scheduling unit 124 calculates the queue load value of each of the plurality of queues corresponding to the plurality of clusters on a periodic basis. If the plurality of queues have greatly different queue load values, the scheduling unit 124 extracts a plurality of jobs placed in a queue with a high queue load value from the queue management unit 122 and containerizes them. The scheduling unit 124 outputs a job request for the container and inserts the job request for the container at the head of the queue that handles the used node count of the container.

The node control unit 125 instructs the HPC system 30 to start a job. For example, the node control unit 125 sends an activation command including a path to a program to be activated, to nodes assigned the job by the scheduling unit 124. In this connection, the scheduling unit 124 distributes the plurality of jobs contained in the container among the plurality of nodes assigned to the container. Therefore, the node control unit 125 instructs the HPC system 30 to start each job contained in the container in the same way as for ordinary jobs.

FIG. 11 illustrates an example of a cluster table, a node table, and a history table.

The cluster table 131 is stored in the database 121. The cluster table 131 indicates the correspondence relationship among a cluster ID, a range of node IDs, and a range of used node counts. The range of node IDs indicates nodes belonging to a cluster. The range of used node counts indicates a condition for jobs that a cluster handles.

For example, the cluster 1 has nodes with node numbers 1 to 21429 and handles jobs whose used node counts are in a range of 1 to 46. In addition, the cluster 2 has nodes with node numbers 21430 to 30000 and handles jobs whose used node counts are in a range of 47 to 2154. The cluster 3 has nodes with node numbers 30001 to 50000 and handles jobs whose used node counts are in a range of 2155 to 10000.

The node table 132 is stored in the database 121. The node table 132 indicates the correspondence relationship among a node ID, a status, and a job ID. The status is a flag indicating whether a node currently executes a job (i.e., busy). The job ID is the identifier of a currently executed job.

The history table 133 is stored in the database 121. The history table 133 indicates the correspondence relationship among a timestamp, a used node count, a waiting time, and an execution time. The timestamp indicates when an event of predetermined type occurs with respect to a job. The timestamp indicates, for example, the time of reception of a job request by the scheduler 100, the start time of the job, or the end time of the job.

The used node count here is the actual number of nodes used for a job. The waiting time is an actual elapsed time after the reception of a job request by the scheduler 100 before the start of the job. The execution time is an actual elapsed time between the start and the end of the job. The waiting time and execution time are represented in minutes, for example. To change clusters, the scheduling unit 124 extracts records with timestamps falling within the most recent one week from the history table 133.

Figure 12:
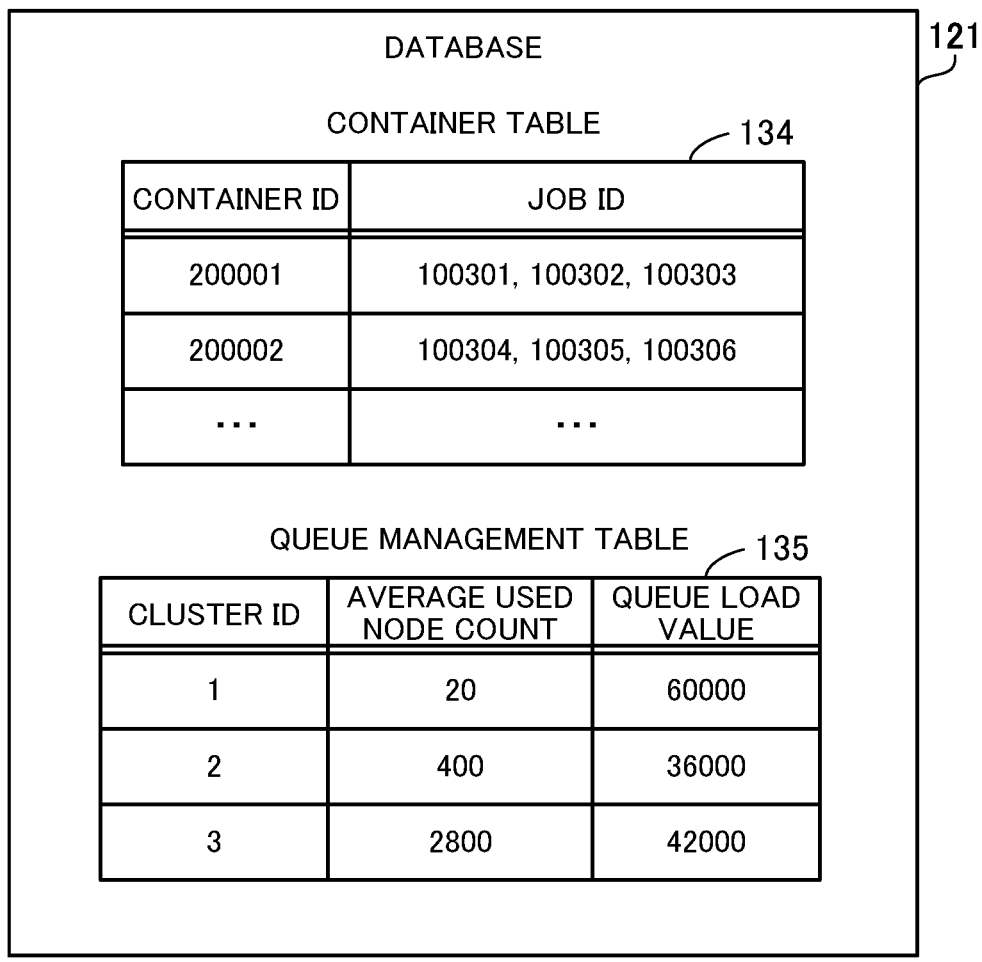
FIG. 12 illustrates an example of a container table and a queue management table.

FIG. 12 illustrates an example of a container table and a queue management table.

The container table 134 is stored in the database 121. The container table 134 indicates the correspondence relationship between a container ID and job IDs. A container ID is an identifier identifying a container. A job ID is an identifier identifying a job. A plurality of job IDs are associated with one container ID. In scheduling, when all jobs contained in a container are completed, the container is determined to be complete.

The queue management table 135 is stored in the database 121. The queue management table 135 indicates the correspondence relationship among a cluster ID, an average used node count, and a queue load value. The cluster ID is an identifier identifying a cluster. The average used node count is an average used node count of jobs executed within a fixed past period of time. The average used node count may be calculated at the time of cluster change or may be updated continually at the start or end of a job. The queue load value is the total load value of jobs placed in the queue. The load value of a job is defined as the product of the specified used node count and the specified maximum execution time. The queue load value is calculated every five minutes, for example.

Figure 13:
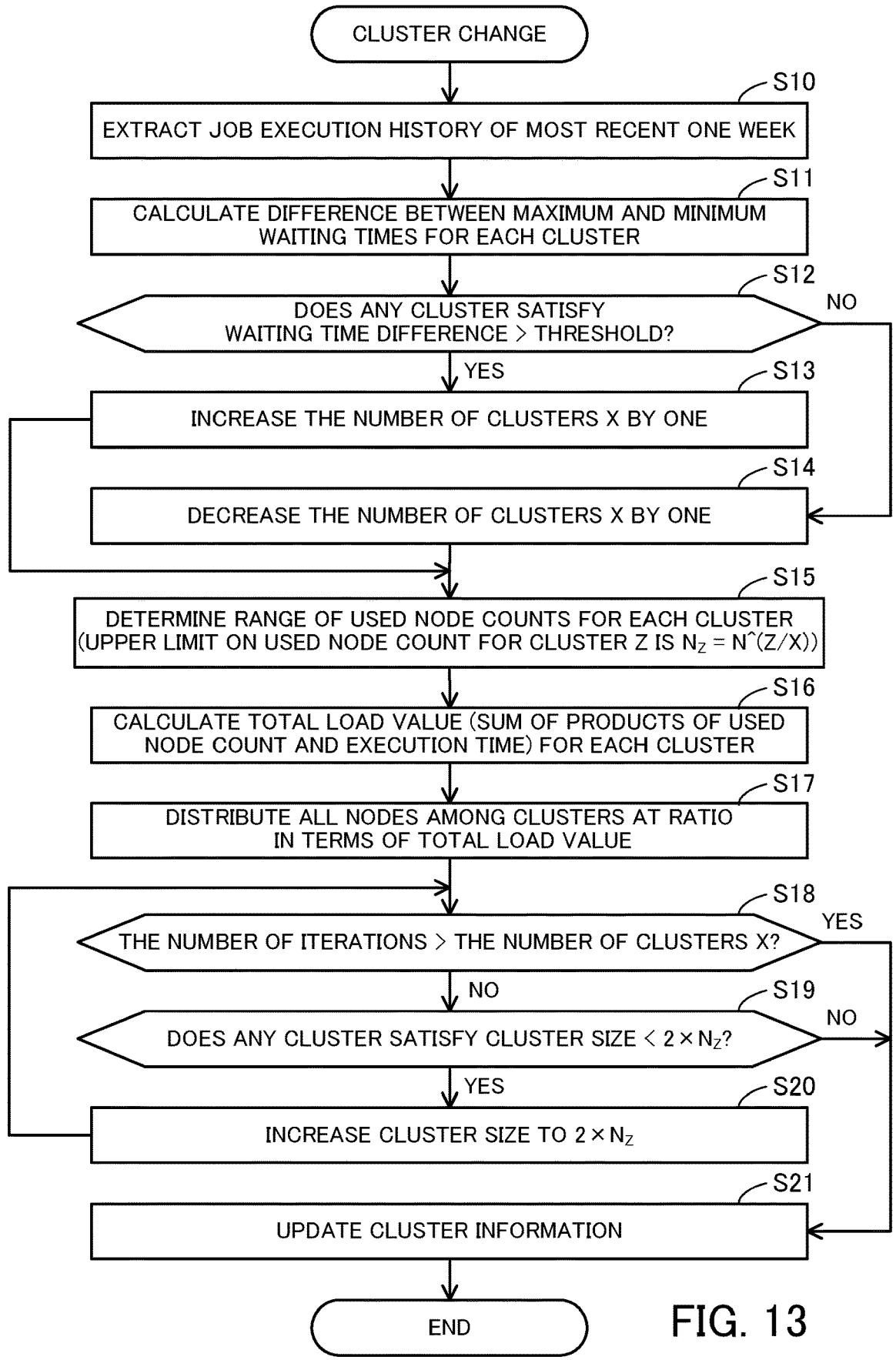
FIG. 13 is a flowchart illustrating an example process of performing a cluster change.

FIG. 13 is a flowchart illustrating an example process of performing a cluster change.

(S10) The scheduling unit 124 extracts a job execution history of the most recent one week.

(S11) The scheduling unit 124 classifies a plurality of jobs executed within the most recent one week into a plurality of current clusters according to their used node counts. The scheduling unit 124 determines, for each cluster, the maximum and minimum values of the waiting times and calculates the waiting time difference between the maximum and minimum waiting times.

(S12) The scheduling unit 124 compares the waiting time difference of each of the plurality of clusters with a threshold preset by the administrator of the HPC system 30. The scheduling unit 124 determines whether there is a cluster whose waiting time difference exceeds the threshold. If the waiting time difference of at least one cluster exceeds the threshold, the process proceeds to step S13. If the waiting time differences of all the clusters are less than or equal to the threshold, the process proceeds to step S14.

(S13) The scheduling unit 124 increases the number of clusters X by one (X=X+1). Then, the process proceeds to step S15.

(S14) The scheduling unit 124 decreases the number of clusters X by one (X=X−1).

(S15) The scheduling unit 124 determines a range of used node counts for each of the X clusters on the basis of the number of clusters X and the maximum value N for the used node count of a job. At this time, the scheduling unit 124 makes this determination such that the clusters granularity. For example, the scheduling unit 124 defines $N^{(Z/X)}$ as the upper limit $N_z$ on the used node count of a job that the cluster Z is to handle.

(S16) The scheduling unit 124 re-classifies the plurality of jobs executed within the most recent one week into the new X clusters according to their used node counts. The scheduling unit 124 then calculates, for each job, the product of the used node count and the execution time as its load value, and with respect to each of the X clusters, calculates the total load value that is the sum of the load values of the jobs belonging to the cluster.

(S17) The scheduling unit 124 distributes all nodes provided in the HPC system 30 among the X clusters in such a manner that the number of nodes is in proportion to the total load value.

(S18) The scheduling unit 124 determines whether the number of iterations of steps S19 and S20 exceeds the number of clusters X. If the number of iterations exceeds the number of clusters X, the process proceeds to step S21; otherwise, the process proceeds to step S19.

(S19) The scheduling unit 124 determines whether the X clusters include a cluster whose cluster size (the number of nodes included in the cluster) is less than twice the upper limit $N_z$ on the used node count of a job that the cluster is to handle. If such a cluster exists, the process proceeds to step S20; otherwise, the process proceeds to step S21.

(S20) The scheduling unit 124 increases the cluster size of a cluster whose cluster size is less than $2 \times N_z$, to $2 \times N_z$. Then, the process returns back to step S18.

(S21) The scheduling unit 124 fixes the cluster sizes of the X clusters. The scheduling unit 124 then updates the cluster information so that the cluster information indicates the correspondence relationship among a determined cluster, a determined range of used node counts, and a determined cluster size.

Figure 14:
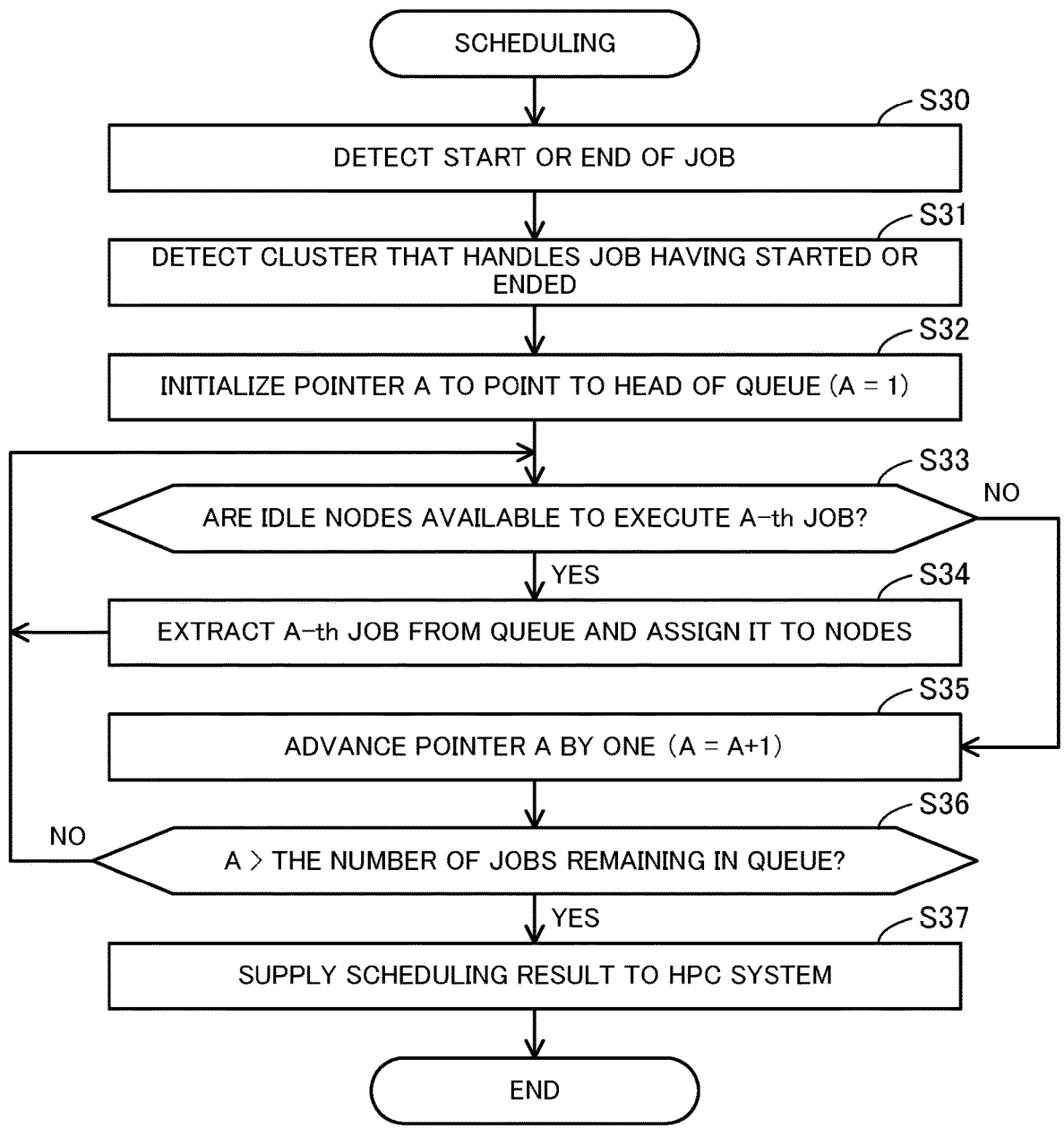
FIG. 14 is a flowchart illustrating an example process of performing scheduling.

FIG. 14 is a flowchart illustrating an example process of performing scheduling.

(S30) The information collecting unit 123 detects the start or end of any job.

(S31) The scheduling unit 124 detects, among the divided X clusters, a cluster Z that handles the job detected to have started or ended at step S30.

(S32) The scheduling unit 124 initializes a pointer A to point to the head of the queue corresponding to the cluster Z among the X queues (A=1).

(S33) The scheduling unit 124 confirms the used node count specified by the A-th job in the queue and determines whether the number of idle nodes is greater than or equal to the used node count, i.e., whether idle nodes are available to execute the A-th job. If such idle nodes are available, the process proceeds to step S34; otherwise, the process proceeds to step S35.

(S34) The scheduling unit 124 extracts the A-th job from the queue and assigns the A-th job to as many idle nodes as its used node count. The scheduling unit 124 registers the assignment information as a provisional scheduling result in the node table 132. Then, the process returns back to step S33. In this connection, step S34 executed in the case where A is two or greater is equivalent to backfilling.

(S35) The scheduling unit 124 advances the pointer A by one (A=A+1).

(S36) The scheduling unit 124 determines whether A is greater than the number of jobs remaining in the queue. If A is greater than the number of remaining jobs, the process proceeds to step S37; otherwise, the process returns back to step S33.

(S37) The scheduling unit 124 reads information registered as the provisional scheduling result from the node table 132. The node control unit 125 supplies the scheduling result to the HPC system 30. The scheduling unit 124 deletes the information registered as the provisional scheduling result from the node table 132.

Figure 15:
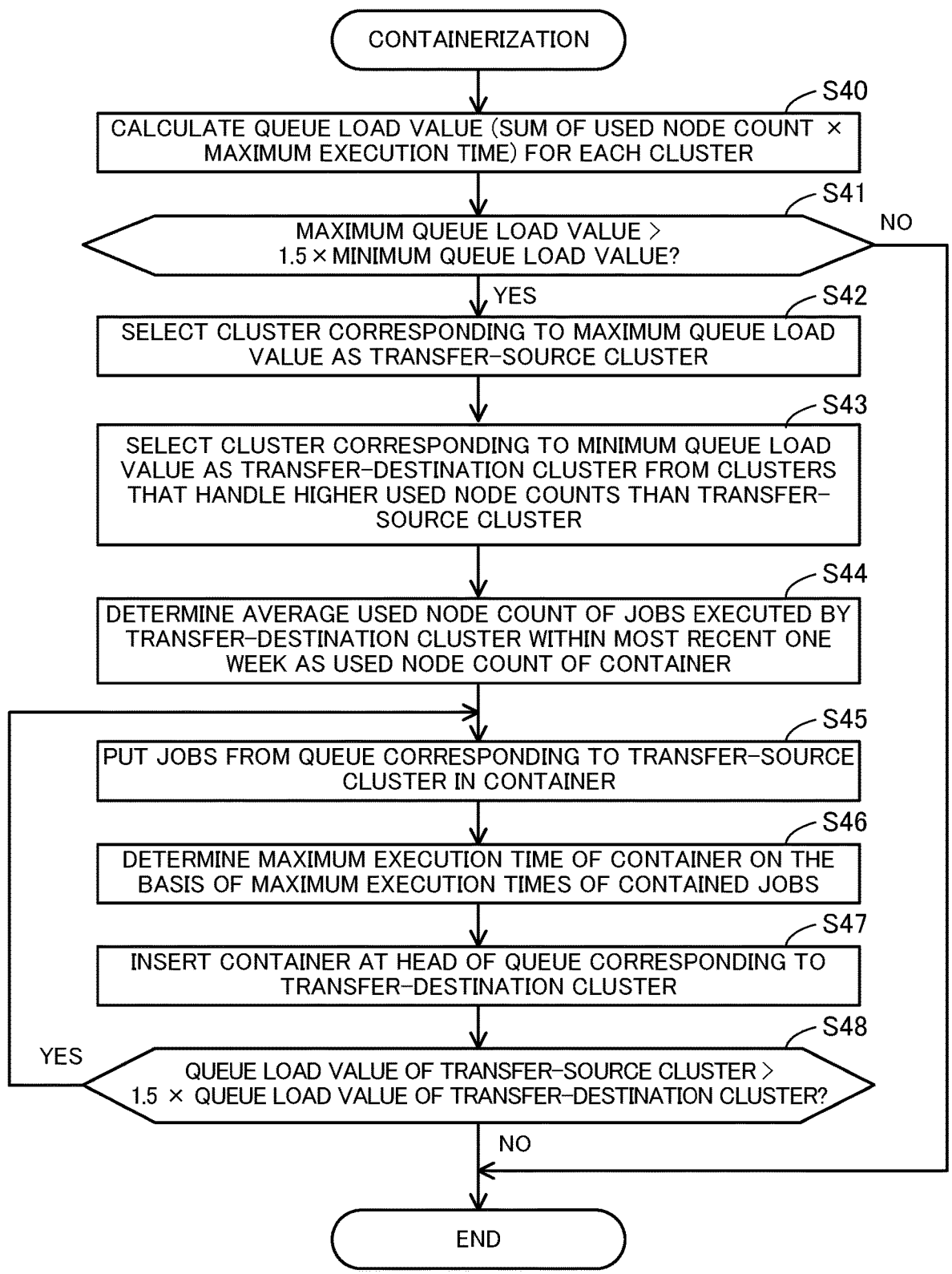
FIG. 15 is a flowchart illustrating an example process of performing containerization.

FIG. 15 is a flowchart illustrating an example process of performing containerization.

(S40) The scheduling unit 124 calculates the individual queue load values of a plurality of clusters. The queue load value of a queue is the sum of load values of jobs waiting for execution (hereinafter, referred to as "waiting jobs") in the queue. The load value of a waiting job is the product of its used node count and maximum execution time.

(S41) The scheduling unit 124 detects the maximum queue load value and the minimum load value from among the queue load values corresponding to the plurality of clusters, and determines whether the maximum queue load value exceeds 1.5 times the minimum queue load value. If the maximum queue load value exceeds 1.5 times the minimum queue load value, the process proceeds to step S42; otherwise, the containerization is completed.

(S42) The scheduling unit 124 selects a cluster corresponding to the maximum queue load value from the plurality of clusters as a transfer-source cluster, from which waiting jobs are transferred.

(S43) The scheduling unit 124 selects a cluster corresponding to the smallest queue load value among clusters that handle higher used node counts than the transfer-source cluster, as a transfer-destination cluster that accepts waiting jobs assigned to the transfer-source cluster. If there is no cluster that handles higher used node counts than the transfer-source cluster, the containerization is completed since a reduction in the load of the transfer-source cluster is not achieved.

(S44) The scheduling unit 124 determines the average used node count of jobs executed by the transfer-destination cluster within the most recent one week, as the used node count of the container.

(S45) The scheduling unit 124 extracts waiting jobs, one by one, in order from one at the head of the queue corresponding to the transfer-source cluster, and inserts the extracted waiting jobs in the container. The scheduling unit 124 puts as many waiting jobs as possible in the container as long as the total used node count does not exceed the used node count of the container.

(S46) The scheduling unit 124 determines the maximum execution time of the container on the basis of the maximum execution times of the waiting jobs contained in the container. The maximum execution time of the container is the maximum value of the maximum execution times of the waiting jobs contained in the container.

(S47) The scheduling unit 124 outputs the container to the queue management unit 122 to insert the container at the head of the queue corresponding to the transfer-destination cluster.

(S48) The scheduling unit 124 re-calculates the queue load value of the transfer-source cluster and the queue load value of the transfer-destination cluster. The scheduling unit 124 then determines whether the queue load value of the transfer-source cluster exceeds 1.5 times that of the transfer-destination cluster. If the queue load value of the transfer-source cluster exceeds 1.5 times that of the transfer-destination cluster, the process proceeds back to step S45 to create another container; otherwise, the containerization is completed.

Figure 16:
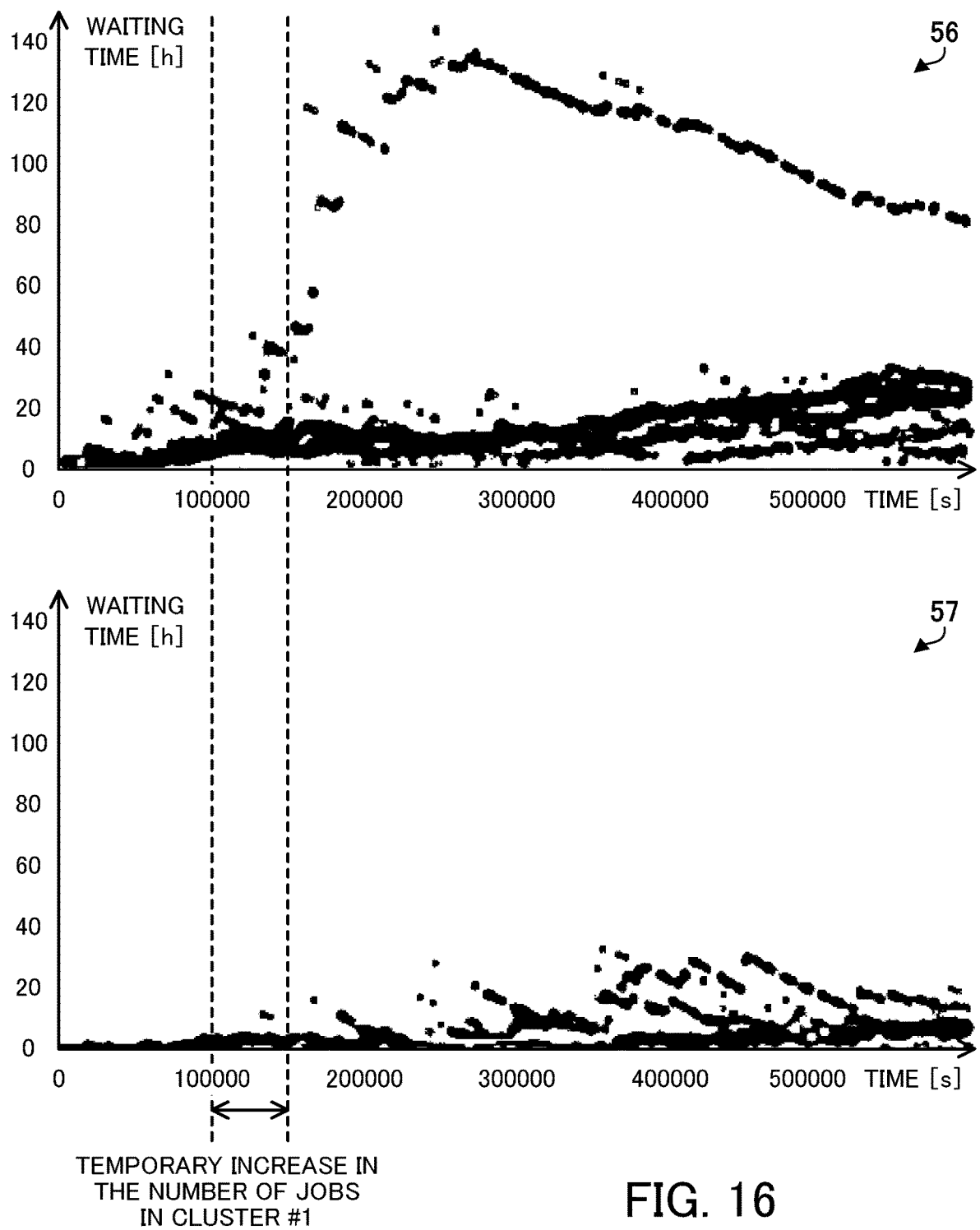
FIG. 16 depicts graphs representing examples of waiting times before and after containerization.

FIG. 16 depicts graphs representing examples of waiting times before and after containerization.

The graphs 56 and 57 are created by plotting combinations of arrival time and waiting time with respect to jobs. The horizontal axis of each graph 56 and 57 represents time, whereas the vertical axis thereof represents waiting time. The graph 56 represents simulation results obtained in the case where the above-described containerization is not performed. The graph 57 represents simulation results obtained in the case where the above-described containerization is performed.

With respect to the simulations represented by the graphs 56 and 57, approximately 100000 nodes are divided into four and job scheduling is performed. In addition, a large number of small-scale jobs that are assigned to a cluster #1 temporarily arrive in a time period from time 100000 to time 150000. The cluster #1 handles a range of smallest used node counts among clusters #1, #2, #3, and #4.

As illustrated in the graph 56, in the case where the containerization is not performed, the waiting time in the cluster #1 rapidly increases, as compared with the other clusters, after the large number of small-scale jobs arrive. The cluster #1 has the maximum waiting time of 138 hours. In addition, it took a long time to solve the long waiting time in the cluster #1.

By contrast, as illustrated in the graph 57, in the case where the containerization is performed, the waiting time in the cluster #1 does not become so long even after the large number of small-scale jobs arrive. The cluster #1 has the maximum waiting time of 37 hours. That is, the containerization reduces the maximum waiting time by 73% as compared with the case where the containerization is not performed. In this connection, since the containerization is performed for the clusters #2, #3, and #4, the graph 57 represents shorter waiting times with respect to the clusters #2, #3, and #4 than the graph 56.

As described above, the scheduler 100 of the second embodiment performs the job scheduling using the BLF algorithm and backfill algorithm. This improves the occupancy rate of the HPC system 30 and thus improves the operating efficiency of the HPC system 30 accordingly.

In addition, the scheduler 100 divides a set of nodes into two or more clusters, and with respect to each job, causes an appropriate one of the clusters to execute the job according to the used node count. The scheduling is performed for large-scale jobs and for small-scale jobs separately. This approach prevents the situation where early start of a small-scale job impedes the scheduling of large-scale jobs, and thus prevents an increase in the waiting times of the large-scale jobs. As a result, the average waiting time and maximum waiting time are reduced. In addition, the differences in waiting time among jobs are reduced, which improves the usability of the HPC system 30.

In addition, the number of clusters is dynamically changed on the basis of the waiting time differences of clusters. Therefore, as compared with the case where the number of clusters is fixed, the differences in waiting time among jobs are further reduced and thus the average waiting time and the maximum waiting time are reduced. In addition, the situation where the number of clusters becomes too large and the occupancy rate decreases is prevented. In addition, the ranges of used node counts to be handled respectively by the clusters are determined in such a manner that the clusters have equal job granularity. This further reduces the average waiting time. In addition, the cluster size of each cluster is determined so as to reflect the loads of past jobs. This further reduces the average waiting time. In addition, the cluster size of each cluster is adjusted so that the cluster size does not fall below twice the upper limit on the used node count of a job. This prevents a decrease in the occupancy rate and an increase in the waiting time due to a lack in the number of nodes.

In addition, the scheduler 100 monitors a plurality of queues corresponding to a plurality of clusters. When detecting that a large number of small-scale jobs have arrived in a short period of time, the scheduler 100 creates a container, which is equivalent to a virtual large-scale job, by combining two or more small-scale jobs, and assigns the container to the nodes of a cluster used for large-scale jobs. This prevents the waiting times of small-scale jobs from temporarily increasing as compared with the large-scale jobs. In addition, the difference in waiting time between the small-scale jobs and the large-scale jobs is reduced and the fairness of waiting time among the jobs is achieved. In addition, the average waiting time and the maximum waiting time are reduced.

In addition, the queue load value indicating the congestion status of a queue of jobs is calculated by multiplying the used node count and the scheduled execution time with respect to each job and summing the products. This makes it possible to properly evaluate the loads on the plurality of clusters. In addition, a condition for performing the containerization is when the maximum queue load value exceeds 1.5 times the minimum queue load value. This makes it possible to properly evaluate the imbalance in load among the clusters. In this connection, the ratio used in the second embodiment is just an example, and any desired ratio may be set by a system administrator.

In addition, the used node count of a container is set to the average used node count of jobs executed in the past by a transfer-destination cluster. By doing so, efficient scheduling is performed without impeding large-scale jobs originally assigned to the transfer-destination cluster, and the use efficiency of the nodes in the transfer-destination cluster is improved. In addition, the container is executed preferentially over the large-scale jobs originally assigned to the transfer-destination cluster. Thereby, an increase in the waiting times of the small-scale jobs is eliminated promptly.

According to one aspect, the waiting times of jobs are reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory that holds information on waiting jobs waiting for execution, the waiting jobs each having a used node count specified; and
a processor that performs a process including
calculating a first load value and a second load value, the first load value indicating a first load of a plurality of first jobs whose used node counts are less than or equal to a threshold among the waiting jobs, the second load value indicating a second load of a plurality of second jobs whose used node counts exceed the threshold among the waiting jobs,
combining two or more first jobs among the plurality of first jobs to create a combined job whose used node count exceeds the threshold, in response to a load condition being satisfied, the load condition including a condition that the first load value exceeds the second load value,
causing a first node group to execute remaining first jobs other than the two or more first jobs among the plurality of first jobs, and
causing a second node group to execute the combined job and the plurality of second jobs.

2. The information processing apparatus according to claim 1, wherein
a scheduled execution time is specified for each of the waiting jobs, and
the first load value is calculated by calculating first products of the used node count and the scheduled execution time with respect to the plurality of first jobs and summing the first products, and the second load value is calculated by calculating second products of the used node count and the scheduled execution time with respect to the plurality of second jobs and summing the second products.

3. The information processing apparatus according to claim 1, wherein the load condition is that a ratio of the first load value to the second load value exceeds a predetermined ratio greater than one.

4. The information processing apparatus according to claim 1, wherein the used node count of the combined job is determined based on used node counts of already-executed jobs executed in a past by the second node group.

5. The information processing apparatus according to claim 1, wherein the two or more first jobs are selected in order of priority from highest from the plurality of first jobs, and the combined job is executed by the second node group preferentially over the plurality of second jobs.

6. A job scheduling method comprising:
calculating, by a processor, a first load value and a second load value, the first load value indicating a first load of a plurality of first jobs whose used node counts are less than or equal to a threshold among waiting jobs waiting for execution, the second load value indicating a second load of a plurality of second jobs whose used node counts exceed the threshold among the waiting jobs;
combining, by the processor, two or more first jobs among the plurality of first jobs to create a combined job whose used node count exceeds the threshold, in response to a load condition being satisfied, the load condition including a condition that the first load value exceeds the second load value;
causing, by the processor, a first node group to execute remaining first jobs other than the two or more first jobs among the plurality of first jobs; and
causing, by the processor, a second node group to execute the combined job and the plurality of second jobs.

* * * * *